US012701074B2

(12) United States Patent
Hu et al.

(10) Patent No.: US 12,701,074 B2
(45) **Date of Patent: *Aug. 4, 2026**

(54) LOOP AVOIDANCE COMMUNICATIONS METHOD, DEVICE, AND SYSTEM

(71) Applicant: Huawei Technologies Co., Ltd., Shenzhen (CN)

(72) Inventors: Chongyang Hu, Beijing (CN); Haibo Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/731,632

(22) Filed: Jun. 3, 2024

(65) Prior Publication Data

US 2024/0323115 A1     Sep. 26, 2024

Related U.S. Application Data

(63) Continuation of application No. 17/136,939, filed on Dec. 29, 2020, now Pat. No. 12,034,631, which is a (Continued)

(30) Foreign Application Priority Data

Jun. 30, 2018     (CN) .......................... 201810703111.7

(51) Int. Cl.
| | |
|---|---|
| *H04L 45/18* | (2022.01) |
| *H04L 45/28* | (2022.01) |

(Continued)

(52) U.S. Cl.
CPC .............. *H04L 45/18* (2013.01); *H04L 45/28* (2013.01); *H04L 45/741* (2013.01); *H04L 45/745* (2013.01); *H04L 2101/622* (2022.05)

(58) Field of Classification Search
CPC ....... H04L 45/18; H04L 45/28; H04L 45/741; H04L 45/745

(Continued)

(56) References Cited

U.S. PATENT DOCUMENTS

| | | | |
|---|---|---|---|
| 8,705,526 | B1 | 4/2014 | Hasan |
| 9,270,426 | B1 | 2/2016 | Atlas et al. |

(Continued)

FOREIGN PATENT DOCUMENTS

| | | |
|---|---|---|
| CA | 2912643 A1 | 9/2016 |
| CN | 102340434 A | 2/2012 |

(Continued)

OTHER PUBLICATIONS

Dawra, G., "BGP Signaling of IPV6-Segment-Routing-based VPN Networks," draft-dawra-idr-srv6-vpn-03, Dec. 26, 2017, 20 pages.

(Continued)

*Primary Examiner* — Ario Etienne
*Assistant Examiner* — Kidest Mendaye
(74) *Attorney, Agent, or Firm* — Conley Rose, P.C.

(57) ABSTRACT

In a loop avoidance communications method, a first provider edge (PE) device sends a first identifier to a second PE device through a first interface; the first PE device receives, from the second PE through the first interface, a data packet including the first identifier. Then, the first PE device determines that a second interface associated with the first identifier is in a faulty state. In response to determining that the second interface is in the faulty state, the first PE device avoids sending the data packet to the second PE device through the first interface. The first PE device connects to a customer edge (CE) device using the second interface.

24 Claims, 8 Drawing Sheets

Related U.S. Application Data continuation of application No. PCT/CN2019/092444, filed on Jun. 23, 2019.

(51) Int. Cl.
| | |
|---|---|
| *H04L 45/741* | (2022.01) |
| *H04L 45/745* | (2022.01) |
| *H04L 101/622* | (2022.01) |

(58) Field of Classification Search
USPC ................................................ 709/238, 228
See application file for complete search history.

(56) References Cited

U.S. PATENT DOCUMENTS

| | | | |
|---|---|---|---|
| 9,680,694 B1 | 6/2017 | Kotrabasappa et al. | |
| 2008/0232384 A1 | 9/2008 | Miyabe | |
| 2010/0002578 A1 | 1/2010 | Fiorone et al. | |
| 2010/0014442 A1* | 1/2010 | Ashwood-Smith | H04L 45/00 |
| | | | 370/255 |
| 2013/0194911 A1 | 8/2013 | Fedyk et al. | |
| 2014/0126422 A1 | 5/2014 | Bragg | |
| 2015/0003458 A1 | 1/2015 | Li et al. | |
| 2015/0043326 A1 | 2/2015 | Fedyk et al. | |
| 2015/0271070 A1 | 9/2015 | Zhou | |
| 2015/0280980 A1* | 10/2015 | Bitar | H04L 67/10 |
| | | | 709/226 |
| 2015/0372901 A1 | 12/2015 | Pacella | |
| 2016/0134591 A1 | 5/2016 | Liao et al. | |
| 2017/0093611 A1 | 3/2017 | Arora et al. | |
| 2017/0099180 A1* | 4/2017 | Singh | H04L 12/4641 |
| 2017/0250904 A1* | 8/2017 | Singarayan | H04L 12/4641 |
| 2018/0375763 A1* | 12/2018 | Brissette | H04L 45/74 |
| 2018/0375764 A1 | 12/2018 | Filsfils et al. | |
| 2019/0089627 A1 | 3/2019 | Mirsky et al. | |
| 2019/0123999 A1* | 4/2019 | Chunduri | H04L 45/68 |
| 2020/0014623 A1 | 1/2020 | Wang et al. | |

FOREIGN PATENT DOCUMENTS

| | | |
|---|---|---|
| CN | 104219147 A | 12/2014 |
| CN | 104601381 A | 5/2015 |
| CN | 104734874 A | 6/2015 |
| CN | 104753754 A | 7/2015 |
| CN | 105119824 A | 12/2015 |
| CN | 105591800 A | 5/2016 |
| CN | 107040462 A | 8/2017 |
| CN | 108574630 A | 9/2018 |
| EP | 2256995 A2 | 12/2010 |
| JP | 2008236212 A | 10/2008 |
| JP | 2010506466 A | 2/2010 |
| JP | 2015508631 A | 3/2015 |
| JP | 2018007094 A | 1/2018 |
| WO | 2008043374 A1 | 4/2008 |
| WO | 2017080440 A1 | 5/2017 |
| WO | 2017177644 A1 | 10/2017 |

OTHER PUBLICATIONS

Eastlake, D., et al., "EVPN All Active Usage Enhancements," draft-eastlake-bess-evpn-vxlan-bypass-vtep-00, Mar. 5, 2018, 15 pages.
Filsfils, C., et al., "SRv6 Network Programming," draft-filsfils-spring-srv6-network-programming-04, Mar. 4, 2018, 57 pages.
Rosen, E., et al., "BGP/MPLS IP Virtual Private Networks (VPNs)," RFC 4364, Feb. 2006, 47 pages.
Sajassi, A., Ed., et al., "BGP MPLS-Based Ethernet VPN," RFC 7432, Feb. 2015, 56 pages.
Deering, S., et al., "Internet Protocol, Version 6 (IPv6) Specification," RFC 8200, Jul. 2017, 42 pages.

* cited by examiner

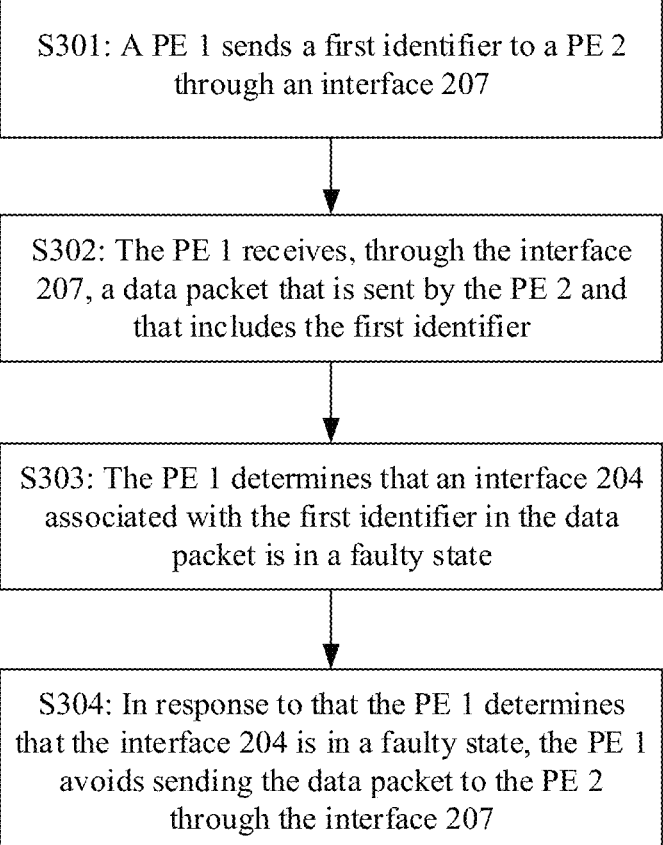

S301: A PE 1 sends a first identifier to a PE 2 through an interface 207

S302: The PE 1 receives, through the interface 207, a data packet that is sent by the PE 2 and that includes the first identifier S303: The PE 1 determines that an interface 204 associated with the first identifier in the data packet is in a faulty state S304: In response to that the PE 1 determines that the interface 204 is in a faulty state, the PE 1 avoids sending the data packet to the PE 2 through the interface 207

FIG. 3

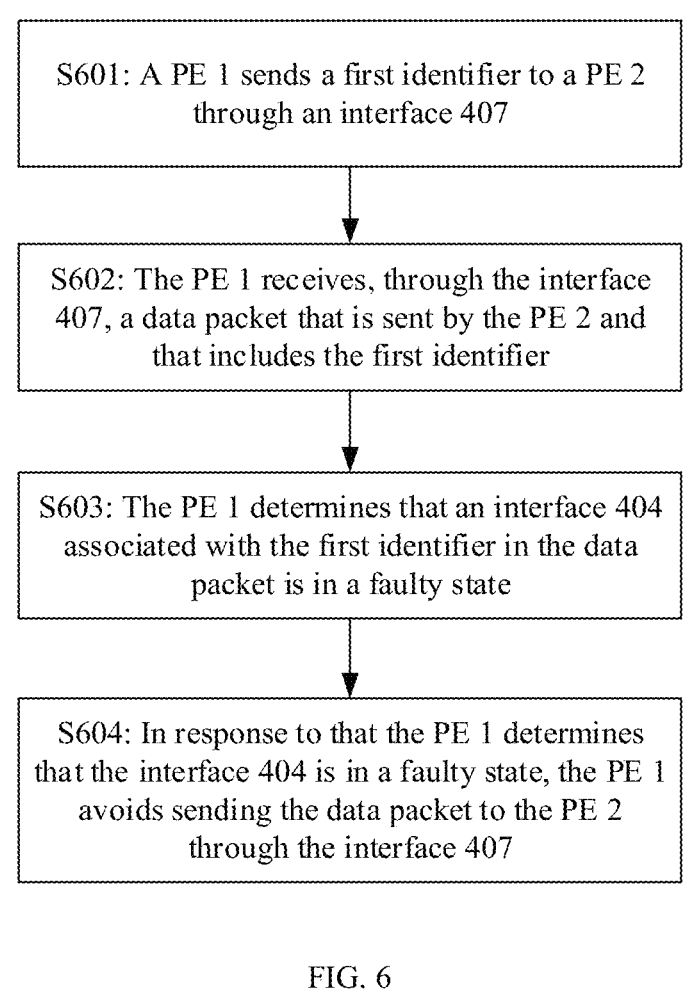

S601: A PE 1 sends a first identifier to a PE 2
through an interface 407

S602: The PE 1 receives, through the interface
407, a data packet that is sent by the PE 2 and
that includes the first identifier S603: The PE 1 determines that an interface 404
associated with the first identifier in the data
packet is in a faulty state S604: In response to that the PE 1 determines
that the interface 404 is in a faulty state, the PE 1
avoids sending the data packet to the PE 2
through the interface 407

FIG. 6

LOOP AVOIDANCE COMMUNICATIONS METHOD, DEVICE, AND SYSTEM

CROSS-REFERENCE TO RELATED APPLICATIONS

This is a continuation of U.S. patent application Ser. No. 17/136,939, filed on Dec. 29, 2020, which is a continuation of Int'l Patent App. No. PCT/CN2019/092444, filed on Jun. 23, 2019, which claims priority to Chinese Patent App. No. 201810703111.7 filed on Jun. 30, 2018, all of which are incorporated by reference.

FIELD

This application relates to the communications field, and in particular, to a loop avoidance communications method, device, and system.

BACKGROUND

An Ethernet virtual private network (EVPN) provides an all-active mode (all-active mode). In the all-active mode, when one device is multi-homed to a plurality of provider edge (PE) devices, all the plurality of PE devices may forward traffic to the device. When the plurality of PE devices are two PE devices, the foregoing all-active mode may also be referred to as an active-active mode (dual-active mode), and the foregoing multi-homing may also be referred to as dual-homing.

In the EVPN active-active mode, when interfaces through which two PE devices are connected to a customer edge (CE) device each are in a faulty state, a loop problem may be caused. For example, as shown in FIG. 1, a CE device CE 1 is dual-homed to PE devices PE 1 and PE 2, and the PE 1 and the PE 2 are in an active-active mode. After the PE 2 receives, from a PE device PE 3, a data packet (packet) to be sent to the CE 1, when an interface through which the PE 2 is connected to the CE 1 is in a faulty state, the PE 2 sends the data packet to the PE 1. After the PE 1 receives the data packet sent by the PE 2, when an interface through which the PE 1 is connected to the CE 1 is in a faulty state, the PE 1 sends the data packet to the PE 2. In this case, the data packet is sent back to the PE 2. Consequently, a loop problem is caused.

SUMMARY

Embodiments of this application provide a communications method, device, and system, to help avoid a loop problem.

According to a first aspect, an embodiment of this application provides a communications method. A first PE device sends a first identifier to a second PE device through a first interface. Subsequently, the first PE device receives, through the first interface, a data packet that is sent by the second PE device and that includes the first identifier. Then, the first PE device determines that a second interface associated with the first identifier is in a faulty state. In response to determining that the second interface is in a faulty state, the first PE device avoids sending the data packet to the second PE device through the first interface. The second interface is an interface through which the first PE device is connected to a CE device.

In the solution provided in the first aspect, based on identification on the first identifier in the data packet, the first PE device avoids returning the data packet to the second PE device when a local interface configured to implement a connection to the CE device is in a faulty state. This avoids a problem of a transmission loop between a PE 1 and a PE 2.

Optionally, the first PE device stores a first entry including the first identifier and an identifier of a second interface, but the first entry does not include an identifier of the first interface. The first PE device may determine the second interface based on the first entry and the first identifier that is in the data packet, to further determine that the second interface is in a faulty state. Because the first entry does not include the identifier of the first interface, the interface determined by the first PE device based on the first entry and the first identifier includes only a local interface configured to implement a connection to the CE device, and does not include a non-local interface configured to implement a connection to the second PE device. This avoids sending the data packet to the second PE device through the non-local interface.

Optionally, the first PE device performs operations associated with the first identifier. The operations include searching a media access control (MAC) forwarding table for a second entry that matches a destination MAC address of the data packet, determining the second interface based on an identifier, in the second entry, of an interface configured to implement a connection to the CE device, and determining that the second interface is in a faulty state. In the operations associated with the first identifier, the matched second entry is searched for only an identifier of a local interface configured to implement a connection to the CE device, instead of an identifier of a non-local interface configured to implement a connection to a PE device. This avoids sending the data packet to the second PE device through the non-local interface.

Optionally, a manner in which the first PE device avoids sending the data packet to the second PE device includes discarding the data packet.

Optionally, the communications method according to the first aspect is applied to a Segment Routing (SR) over Internet Protocol (IP) version 6 (IPv6) (SRv6) EVPN, and the first identifier is carried in an SRv6-VPN SID attribute. Therefore, an SRv6-VPN SID attribute with new "type" is used to resolve a loop problem in an SRv6 EVPN active-active mode.

According to a second aspect, an embodiment of this application provides a communications device. The communications device may be a first PE device. The first PE device includes a first interface configured to implement a connection to a second PE device, a second interface configured to implement a connection to a CE device, and a processor. The processor is configured to send a first identifier to the second PE device through the first interface, receive, through the first interface, a data packet sent by the second PE device, determine that the second interface associated with the first identifier in the data packet is in a faulty state, and in response to that the first PE device determines that the second interface is in a faulty state, avoid sending the data packet to the second PE device through the first interface.

Optionally, the first PE device includes a memory configured to store a first entry. The first entry includes the first identifier and an identifier of the second interface, but does not include an identifier of the first interface. The processor is configured to determine the second interface based on the first entry and the first identifier that is in the data packet.

Optionally, the processor is configured to perform operations associated with the first identifier. The operations include searching a MAC forwarding table for a second entry that matches a destination MAC address of the data packet, determining the second interface based on an identifier, in the second entry, of an interface configured to implement a connection to the CE device, and determining that the second interface is in a faulty state.

Optionally, the processor is configured to discard the data packet. A manner in which the processor avoids sending the data packet to the second PE device through the first interface includes discarding the data packet.

Optionally, the first PE device is applied to an SRv6 EVPN, and the first identifier is carried in an SRv6-VPN SID attribute.

According to a third aspect, an embodiment of this application provides a communications system, including a first PE device and a second PE device. The first PE device is configured to perform the communications method according to the first aspect and any optional solution of the first aspect. The second PE device is configured to receive a first identifier sent by the first PE device, and send a data packet including the first identifier to the first PE device.

Optionally, the second PE device is configured to determine that a third interface is in a faulty state, and in response to determining that the third interface is in a faulty state, send the data packet including the first identifier to the first PE device. The third interface is an interface through which the second PE device is connected to a CE device.

Optionally, the communications system is applied to an SRv6 EVPN, and the first identifier is carried in an SRv6-VPN SID attribute.

According to a fourth aspect, an embodiment of this application provides a communications device. The communications device may be a first PE device. The first PE device includes a unit configured to implement the communications method according to the first aspect and any optional solution of the first aspect.

According to a fifth aspect, an embodiment of this application provides a communications device. The communications device may be a first PE device. The first PE device includes a processor and a memory that stores a computer program instruction. The processor is configured to execute the computer program instruction such that the first PE device is enabled to perform the communications method according to the first aspect and any optional solution of the first aspect.

According to a sixth aspect, an embodiment of this application provides a computer storage medium configured to store a computer program instruction. When the computer program instruction is executed by a communications device, the communications device is enabled to perform the communications method according to the first aspect and any optional solution of the first aspect.

According to a seventh aspect, an embodiment of this application provides a computer program product including a computer program instruction. When the computer program instruction is executed by a communications device, the communications device is enabled to perform the communications method according to the first aspect and any optional solution of the first aspect.

BRIEF DESCRIPTION OF THE DRAWINGS

FIG. 3 is a flowchart of a communications method according to an embodiment of this application;
FIG. 6 is a flowchart of a communications method according to an embodiment of this application.

DETAILED DESCRIPTION

To make the objectives, technical solutions, and advantages of this application clearer, the following further describes implementations of this application with reference to the accompanying drawings.

In SRv6, a segment routing header (SRH) is inserted into an IPV6 data packet, and the SRH includes an IPV6 address list and indexes pointing to the IPV6 address list. A segment endpoint node on a data packet forwarding path separately searches for IPV6 addresses based on the indexes, and updates a destination address of the data packet using a found IPV6 address in order to implement forwarding. The destination address of the data packet is an IPV6 address, and the IPV6 address in SRv6 may be a segment identifier (SID).

An SRv6 EVPN is an SRv6-based EVPN.

A virtual private wire service (VPWS) is a point-to-point layer 2 virtual private network (VPN) service. An EVPN VPWS is a VPWS implemented on an EVPN. The EVPN VPWS may provide a single-active multi-homing capability or an all-active multi-homing capability.

An attachment circuit (AC) is a physical or logical circuit attaching a CE device to a PE device.

An Ethernet virtual private line (EVPL) is used to provide a point-to-point Ethernet connection between a pair of ACs. The VPWS is implemented based on the EVPL.

In terms of an Ethernet segment (ES), if one CE is multi-homed to two or more PEs, a group of Ethernet links such as a plurality of ACs through which the CE is connected to the PEs belong to one ES, and an identifier for uniquely identifying the ES is an Ethernet segment identifier (ESI).

An Ethernet tag identifier (Ethernet Tag ID) is used to identify a specific broadcast domain.

A broadcast domain (BD) corresponds to a virtual local area network (VLAN).

A local interface is an interface through which a PE device is directly connected to a CE device or an AC without connection to another PE device. For example, in FIG. 2, interfaces 204 and 205 are local interfaces, but interfaces 207 and 208 are not local interfaces.

In this application, an interface through which a PE device is connected to a CE device or an AC is an interface through which the PE device is directly connected to the CE device or the AC without connection to another PE device. In this application, an interface through which a PE device sends a data packet to another PE device or a CE device may also be referred to as an outbound interface, and a local interface that is on a PE device and that is configured to send a data packet to a CE device or an AC may also be referred to as a local outbound interface. In this application, the interface may be a physical port or a logical port on the physical port.

Figure 1:
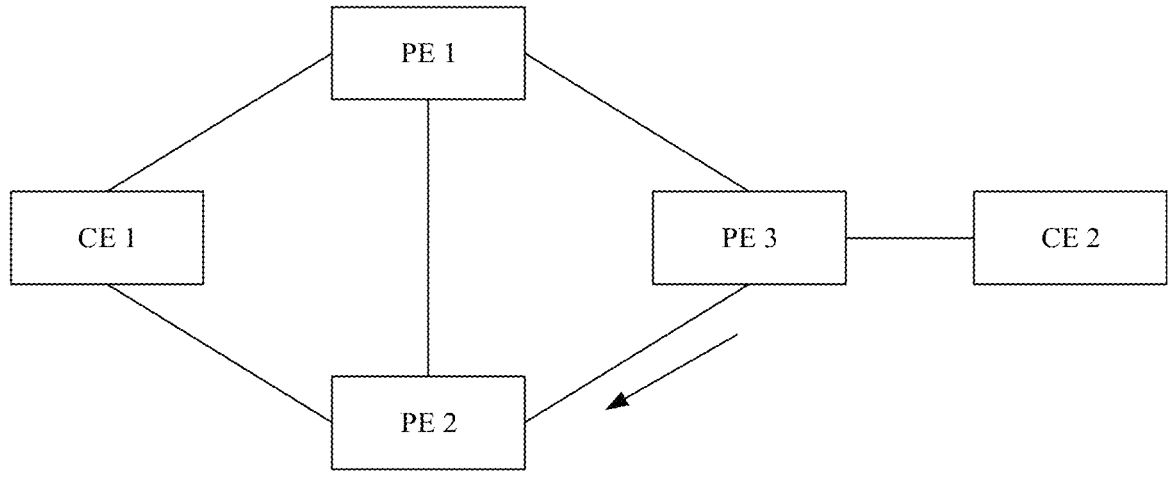
FIG. 1 is a schematic diagram of an application scenario.
Figure 2:
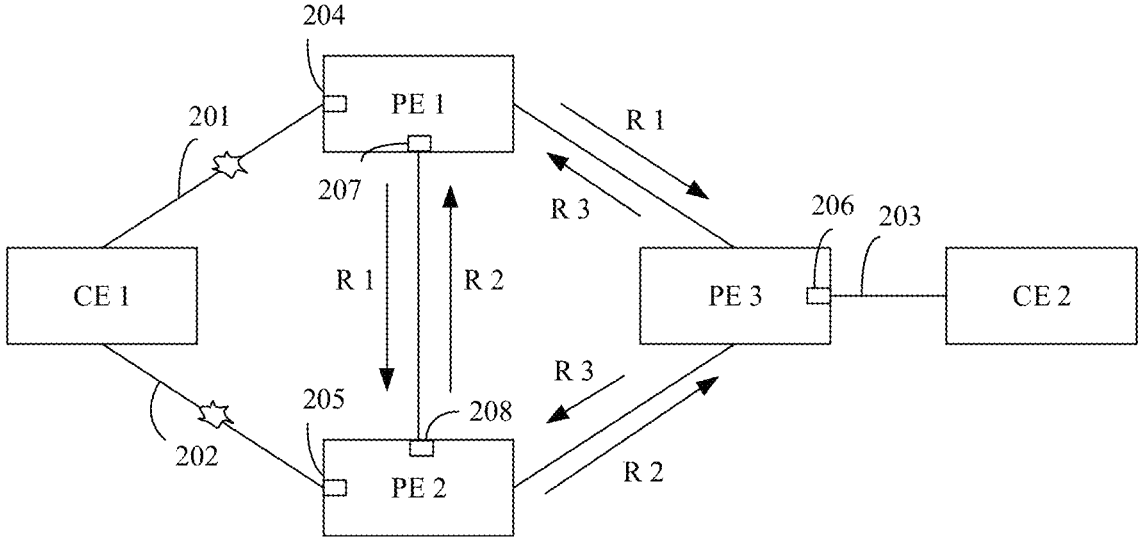
FIG. 2 is a schematic diagram of an SRv6 EVPN active-active scenario according to an embodiment of this application.

FIG. 2 is a schematic diagram of an SRv6 EVPN active-active scenario according to an embodiment of this application. A network shown in FIG. 2 may provide a virtual private wire service VPWS. The network shown in FIG. 2 includes CE devices CE 1 and CE 2, and PE devices PE 1, PE 2, and PE 3. The PE 1, the PE 2, and the PE 3 are respectively connected to the CE 1, the CE 1, and the CE 2 through attachment circuits AC 201, AC 202, and AC 203. The PE 1, the PE 2, and the PE 3 are respectively connected to the AC 201, the AC 202, and the AC 203 through interfaces 204, 205, and 206. The interfaces 204, 205, and 206 are all local interfaces, and interfaces 207 and 208 are non-local interfaces. The PE 1 is connected to the PE 2 through the interface 207, and the PE 2 is connected to the PE 1 through the interface 208. In an example, the PE 1, the PE 2, and the PE 3 are configured as follows.

On the PE 1, an ESI attribute value of the interface 204 is an ESI 1, values of local and peer Ethernet tag IDs associated with the interface 204 are respectively 1 and 2, and a SID associated with an EVPL is 1::1. A specific configuration process is, for example, as follows. The ESI attribute value of the interface 204 is set to the ESI 1. An EVPL processing module associated with the interface 204 is set as an EVPL 1. Values of local and peer Ethernet tag IDs associated with the EVPL 1 are respectively set to 1 and 2. A SID associated with the EVPL 1 is set to 1::1, to be specific, the SID associated with the processing module EVPL 1 configured to process EVPL related data on the PE 1 is set to 1::1. It is equivalent to that the SID associated with the EVPL is set to 1::1 on the PE 1, that is, a SID associated with an EVPL service on the PE 1 is set to 1::1.

On the PE 2, an ESI attribute value of the interface 205 is the ESI 1, values of local and peer Ethernet tag IDs associated with the interface 205 are respectively 1 and 2, and a SID associated with an EVPL is 2::1. A specific configuration process is, for example, as follows. The ESI attribute value of the interface 205 is set to the ESI 1. An EVPL processing module associated with the interface 205 is set as an EVPL 2. Values of local and peer Ethernet tag IDs associated with the EVPL 2 are respectively set to 1 and 2. A SID associated with the EVPL 2 is set to 2::1, to be specific, the SID associated with the processing module EVPL 2 configured to process EVPL related data on the PE 2 is set to 2::1. It is equivalent to that the SID associated with the EVPL is set to 2::1 on the PE 2, that is, a SID associated with an EVPL service on the PE 2 is set to 2::1.

On the PE 3, an ESI attribute value of the interface 206 is an ESI 2, values of local and peer Ethernet tag IDs associated with the interface 206 are respectively 2 and 1, and a SID associated with an EVPL is 3::1. A specific configuration process is, for example, as follows. The ESI attribute value of the interface 206 is set to the ESI 2. An EVPL processing module associated with the interface 206 is set as an EVPL 3. Values of local and peer Ethernet tag IDs associated with the EVPL 3 are respectively set to 2 and 1. A SID associated with the EVPL 3 is set to 3::1, to be specific, the SID associated with the processing module EVPL 3 configured to process EVPL related data on the PE 3 is set to 3::1. It is equivalent to that the SID associated with the EVPL is set to 3::1 on the PE 3, that is, a SID associated with an EVPL service on the PE 3 is set to 3::1.

In this scenario, to provide a VPWS and an active-active mode, the PE 1, the PE 2, and the PE 3 send a routing message to each other. The routing message may be a Border Gateway Protocol (BGP) message. The BGP message may include an Ethernet auto-discovery route (A-D route) and an SRv6-VPN SID attribute. The Ethernet auto-discovery route, referred to as an AD route for short, may include an ESI field and an Ethernet tag ID field. The SRv6-VPN SID attribute is an attribute in a type, length, and value (TLV) format, and includes a type field, a length field, and a value field, where "type" may be 1 or 2. In the scenario shown in FIG. 2, a value of an SRv6-VPN SID attribute whose "type" is 2 is referred to as an EVPL attribute value below. The EVPL attribute value may be used to notify a peer device of a SID that is configured on a local device and that is associated with an EVPL. For details about the Ethernet auto-discovery route, refer to descriptions in the Internet Engineering Task Force (IETF) request for comments (RFC) 7432. For details about the SRv6-VPN SID, refer to descriptions in the IETF draft "BGP Signaling of IPV6-Segment-Routing-based VPN Networks, draft-dawra-idr-srv6-vpn-03".

In an example, the PE 1 generates an AD route E1. In E1, a value of an ESI field is the ESI attribute value ESI 1 of the interface 204 that is set on the PE 1, and a value of an Ethernet tag ID field is the value that is of the local Ethernet tag ID associated with the interface 204 and that is set to 1 on the PE 1. The PE 1 sends a routing message R1 that carries E1 and an EVPL attribute value to the PE 2 and the PE 3. The EVPL attribute value is 1::1. The EVPL attribute value may be used to notify the PE 2 and the PE 3 that the SID value associated with the EVPL on the PE 1 is 1::1. Similarly, the PE 2 generates an AD route E2. In E2, a value of an ESI field is the ESI attribute value ESI 1 of the interface 205 that is set on the PE 2, and a value of an Ethernet tag ID field is the value that is of the local Ethernet tag ID associated with the interface 205 and that is set to 1 on the PE 2. The PE 2 sends a routing message R2 that carries E2 and an EVPL attribute value to the PE 1 and the PE 3. The EVPL attribute value is 2::1. The PE 3 generates an AD route E3. In E3, a value of an ESI field is the ESI attribute value ESI 2 of the interface 206 that is set on the PE 3, and a value of an Ethernet tag ID field is the value that is of the local Ethernet tag ID associated with the interface 206 and that is set to 2 on the PE 3. The PE 3 sends a routing message R3 that carries E3 and an EVPL attribute value to the PE 1 and the PE 2. The EVPL attribute value is 3::1.

After receiving the routing message R2 sent by the PE 2, the PE 1 may determine that the value of the ESI field in the routing message R2 and the value of the ESI field in the AD route E1 generated by the PE 1 are the same and both are the ESI 1, and the two ESI fields belong to a same Ethernet segment. Therefore, the PE 1 may determine that the PE 2 is an alternate device of the PE 1, and may determine a repair path based on the routing message R2. That is, the PE 1 may determine that the repair path from the PE 1 to the CE 1 is: PE 1->PE 2->CE 1. In this case, there are two paths from the PE 1 to the CE 1. One path is an active path: PE 1->local interface 204->CE 1. The other path is the repair path: PE 1->interface 207->PE 2->CE 1. When the interface 204 through which the PE 1 is connected to the CE 1 is in a faulty state, the PE 1 may send a data packet to the PE 2 through the interface 207 such that the PE 2 sends the data packet to the CE 1 to implement fast reroute (FRR). In this application, the repair path may also be referred to as a bypass path. Similarly, after receiving the routing message R1 sent by the PE 1, the PE 2 may determine that the PE 1 is an alternate device of the PE 2, and may determine a repair path based on the routing message R1. That is, the PE 2 may determine that the repair path from the PE 2 to the CE 1 is: PE 2->PE 1->CE 1. In this case, there are two paths from the PE 2 to the CE 1. One path is an active path: PE 2->local interface 205->CE 1. The other path is the repair path: PE 2->interface 208->PE 1->CE 1. When the interface 205 through which the PE 2 is connected to the CE 1 is in a faulty state, the PE 2 may send a data packet to the PE 1 through the interface 208 such that the PE 1 sends the data packet to the CE 1 to implement FRR.

After receiving the routing message R2 sent by the PE 2, the PE 3 determines that the value of the peer Ethernet tag ID configured on the PE 3 and the value of the Ethernet tag ID in the routing message R2 are the same and both are 1. Similarly, after receiving the routing message R3 sent by the PE 3, the PE 2 determines that the value of the peer Ethernet tag ID configured on the PE 2 and the value of the Ethernet tag ID in the routing message R3 are the same and both are 2. That is, the local and peer Ethernet tag IDs of the PE 2 are respectively the same as the peer and local Ethernet tag IDs of the PE 3. Therefore, an EVPL is established between the PE 2 and the PE 3. Two ends of the EVPL are respectively connected to the attachment circuits AC 202 and AC 203 such that a data packet sent by the CE 2 can be sent to the CE 1 through the AC 203, the EVPL, and the AC 202. The PE 3 may obtain the EVPL attribute value 2::1 from the routing message R2. After the EVPL is established between the PE 2 and the PE 3, when the PE 3 has a data packet to be sent to the CE 1, the PE 3 may send the data packet to the PE 2 using 2::1 as a destination address of the data packet such that the data packet is sent to the PE 2 through the EVPL between the PE 2 and the PE 3. In this application, a destination address of a data packet may be a destination address in an IPV6 packet header of the data packet. The destination address is an IPV6 address, and the IPV6 address in SRv6 may be a segment identifier SID. After receiving the data packet, the PE 2 identifies that the destination address 2::1 of the data packet is the SID value associated with the EVPL, and performs operations associated with the SID value 2::1 associated with the EVPL. The associated operations include determining an entry y2 associated with the SID value 2::1 on the PE 2, where the entry y2 includes the SID value 2::1, an identifier of the local interface 205, and an identifier of the interface 208, determining whether the local interface 205 in the entry y2 is in a faulty state, and when the local interface 205 is not in a faulty state, sending the data packet to the CE 1 through the local interface 205, or when the local interface 205 is in a faulty state, sending the data packet to the PE 1 through the interface 208.

A SID value in SRv6 may be associated with a series of instructions. The series of instructions may also be referred to as functions. In this application, a function may also be referred to as an operation. An operation associated with each SID value on each PE device may be preconfigured. For example, to perform an operation associated with the SID value 1::1 on the PE 1, the PE 1 pre-stores an entry y1. The entry y1 includes the SID value 1::1 and all interfaces that are on the PE 1 and that may be configured to send a data packet to the CE 1. The interfaces include the local interface 204 and the interface 207, and the interface 207 is configured to send a data packet to the PE 2 to implement FRR. For another example, to perform the operation associated with the SID value 2::1 on the PE 2, the PE 2 pre-stores the entry y2. The entry y2 includes the SID value 2::1 and all interfaces that are on the PE 2 and that may be configured to send a data packet to the CE 1. The interfaces include the local interface 205 and the interface 208, and the interface 208 is configured to send a data packet to the PE 1 to implement FRR. The IETF draft "SRv6 Network Programming, draft-filsfils-spring-srv6-network-programming-04" defines SID-associated functions. For details about operations associated with an SID value associated with an EVPL in this scenario, refer to an End.DX2 function described in section 4.4 of the draft. The End.DX2 function includes forwarding a data packet through an outbound interface associated with an SID. Based on the End.DX2 function, the foregoing functions associated with the SID value 1::1 on the PE 1 include sending a data packet through the local interface 204 or the interface 207, and the foregoing functions associated with the SID value 2::1 on the PE 2 include sending a data packet through the local interface 205 or the interface 208.

Similarly, the PE 3 receives the routing message R1 sent by the PE 1, and the PE 1 receives the routing message R3 sent by the PE 3. The local and peer Ethernet tag IDs of the PE 1 are respectively the same as the peer and local Ethernet tag IDs of the PE 3. Therefore, an EVPL is established between the PE 1 and the PE 3. Two ends of the EVPL are respectively connected to the attachment circuits AC 201 and AC 203 such that a data packet sent by the CE 2 can be sent to the CE 1 through the AC 203, the EVPL, and the AC 201. The PE 3 may obtain the EVPL attribute value 1::1 from the routing message R1. After the EVPL is established between the PE 1 and the PE 3, when the PE 3 has a data packet to be sent to the CE 1, the PE 3 may send the data packet to the PE 1 using 1::1 as a destination address of the data packet such that the data packet is sent to the PE 1 through the EVPL between the PE 1 and the PE 3. After receiving the data packet, the PE 1 identifies that the destination address 1::1 of the data packet is the SID value associated with the EVPL, and performs the operations associated with the SID value 1::1 associated with the EVPL. The associated operations include determining the entry y1 associated with the SID value 1::1 on the PE 1, where the entry y1 includes the SID value 1::1, an identifier of the local interface 204, and an identifier of the interface 207, determining whether the local interface 204 in the entry y1 is in a faulty state, and when the local interface 204 is not in a faulty state, sending the data packet to the CE 1 through the local interface 204, or when the local interface 204 is in a faulty state, sending the data packet to the PE 2 through the interface 207.

In the foregoing scenario, to implement FRR, the PE 1 and the PE 2 determine repair paths based on the routing messages sent by the PE 1 and the PE 2, for example, based on the EVPL attribute values, that is, based on the values associated with the EVPLs on the PE 1 and the PE 2. In this way, when the PE 2 receives, from the PE 3, a data packet to be sent to the CE 1, if the PE 2 determines that the local interface 205 is in a faulty state, the PE 2 may send, to the PE 1 through the interface 208 using the value 1::1 associated with the EVPL on the PE 1 as a destination address of the data packet, the data packet to be sent to the CE 1 in order to trigger the PE 1 to forward the data packet through the local interface 204 to implement FRR. After receiving the data packet, the PE 1 performs the operations associated with the SID value 1::1 associated with the EVPL. The operations include determining the entry y1 associated with the SID value 1::1, determining, based on the entry y1, whether the local interface 204 on the PE 1 is in a faulty state, and when the local interface 204 is not in a faulty state, sending the data packet to the CE 1 through the local interface 204 to implement FRR. However, when the local interface 204 is also in a faulty state, the PE 1 uses the value 2::1 associated with the EVPL on the PE 2 as a destination address of the data packet to send the data packet to the PE 2 in order to trigger the PE 2 to forward the data packet through the local interface 205. In this case, the PE 2 subsequently modifies the destination address of the data packet to 1::1 again, and uses 1::1 as the destination address of the data packet to return the data packet to the PE 1 again. Consequently, a data packet transmission loop is caused. After receiving a route withdrawal notification, the PE 3 stops sending a new data packet to the PE 2 such that the loop can be stopped. The caused loop can be eliminated only after the PE 1 or the PE 2 receives the route withdrawal notification and withdraws a respective route. A loop problem may cause a network resource waste and affect a PE device performance.

In this application, that an interface is in a faulty state may be that the interface is faulty, for example, a function of the interface is damaged, or may be that an AC connected to the interface is faulty, for example, the link is interrupted. In this application, that an interface is not in a faulty state may be that the interface is in a normal state, to be specific, a data packet can be sent to an AC connected to the interface through the interface. A PE device may store interface state information. When the PE device detects that an interface is faulty, for example, when a physical signal received through a physical port on which the interface is located is interrupted or when a bit error rate of a data packet received through the interface is greater than a threshold, the PE device may update the interface state information stored by the PE device, for example, may identify that the interface is in a faulty state. The PE device may determine, based on the stored interface state information, whether a local interface or a non-local interface is in a faulty state. The foregoing manner in which a PE determines whether an interface is in a faulty state is merely an example.

The IETF draft "BGP Signaling of IPV6-Segment-Routing-based VPN Networks, draft-dawra-idr-srv6-vpn-03" defines an SRv6-VPN SID attribute whose "type" is 1 and an SRv6-VPN SID attribute whose "type" is 2 in a TLV format in a BGP message. In the embodiments of this application, an SRv6-VPN SID attribute with new "type" is defined and may also be referred to as a bypass attribute, and "type" is, for example, 3. This attribute is used to resolve the foregoing loop problem. A value of the bypass attribute is referred to a bypass attribute value for short. In an active-active scenario, two devices that respectively work in an active mode and a standby mode may notify each other of a bypass attribute value. During FRR, when a device that receives a bypass attribute value sends a data packet through a repair path, that is, sends the data packet to an alternate device through an interface configured to implement a connection to the alternate device, the device may add the bypass attribute value to the data packet, for example, use the bypass attribute value as a destination address of the data packet.

FIG. 3 is a flowchart of a communications method according to an embodiment of this application in the scenario shown in FIG. 2.

S301: The PE 1 sends a first identifier to the PE 2 through the interface 207.

The first identifier is a bypass attribute value, for example, 1::2. In an example, the foregoing routing message R1 sent by the PE 1 to the PE 2 may carry a bypass attribute, "type" of the bypass attribute is 3, and a bypass attribute value of the bypass attribute is 1::2.

In an example, before the PE 1 sends the first identifier, the PE 1 stores an entry w1. The entry w1 includes the SID value 1::2 and an identifier of the local interface 204, and the entry w1 does not include an identifier of the interface 207. Therefore, when the PE 1 subsequently performs operations associated with the SID value 1::2, the PE 1 may determine, based on the entry w1, the interface 204 for sending a data packet.

The PE 2 receives, through the interface 208, the first identifier sent by the PE 1.

S302: The PE 1 receives, through the interface 207, a data packet sent by the PE 2, where the data packet includes the first identifier.

A manner in which the data packet includes the first identifier is, for example, that a destination address of the data packet is the first identifier. The destination address of the data packet may be an IPV6 address.

The PE 2 may send the data packet to the PE 1 through the interface 208. As described above, when the PE 2 sends the data packet to the CE 1, there may be two paths to be selected. One path is an active path: PE 2->local interface 205->CE 1. The other path is a repair path: PE 2->interface 208->PE 1->CE 1. That is, when the active path is selected to send the data packet, the data packet is sent to the local interface 205, or when the repair path is selected to send the data packet, the data packet is sent to the interface 208.

In an example, the PE 2 first determines whether the local interface 205 is in a faulty state. When the local interface 205 is not in a faulty state, in response to determining that the local interface 205 is in a normal state or is not in a faulty state, the PE 2 may send the data packet to the CE 1 through the local interface 205. In this case, the active path is selected to send, to the CE 1, the data packet to be sent to the CE 1. When the local interface 205 is in a faulty state, in response to determining that the local interface 205 is in a faulty state, the PE 2 may send the data packet to the PE 1 through the interface 208 using the first identifier as the destination address. In this case, the repair path is selected to send the data packet to be sent to the CE 1.

In an example, the PE 2 receives the data packet sent by the PE 3. A destination address of the data packet is an EVPL attribute value carried in the routing message R2 sent by the PE 2 to the PE 3, for example, 2::1. A process in which the PE 3 sends a data packet to the PE 2 is described above. Subsequently, the PE 2 determines, based on the destination address 2::1 of the data packet, an entry y2 that is stored by the PE 2 and that is associated with an SID value 2::1. The entry y2 includes the SID value 2::1, an identifier of the local interface 205, and an identifier of the interface 208. Then, the PE 2 determines, based on the identifier of the local interface 205 in the entry y2, whether the local interface 205 is in a faulty state. In response to determining that the local interface 205 is in a faulty state, the PE 2 modifies the destination address 2::1 of the data packet to the first identifier 1::2, and sends the data packet whose destination address is 1::2 to the PE 1 based on the identifier of the interface 208 in the entry y2 through the interface 208. In this case, the repair path is selected to send the data packet to be sent to the CE 1. Optionally, the entry y2 includes the first identifier 1::2.

S303: The PE 1 determines that the interface 204 associated with the first identifier in the data packet is in a faulty state.

S304: In response to that the PE 1 determines that the interface 204 is in a faulty state, the PE 1 avoids sending the data packet to the PE 2 through the interface 207.

After receiving the data packet, the PE 1 obtains the first identifier from the data packet, for example, the destination address 1::2 of the data packet. The PE 1 determines whether the local interface 204 associated with the first identifier 1::2 is in a faulty state. In response to determining that the local interface 204 is not in a faulty state, the PE 1 sends the data packet to the CE 1 through the local interface 204, or in response to determining that the local interface 204 is in a faulty state, the PE 1 avoids sending the data packet to the PE 2 through the interface 207. Therefore, when both the interface 204 and the interface 205 are in a faulty state, the data packet sent by the PE 2 is prevented from being sent back to the PE 2, thereby avoiding a loop. A manner in which the PE 1 avoids sending the data packet to the PE 2 through the interface 207 is discarding the data packet received from the PE 2.

In an example, the PE 1 determines the local interface 204 based on the entry w1 and the first identifier 1::2 that are stored by the PE 1. Because the entry w1 includes the SID value 1::2 and the identifier of the local interface 204, but does not include the identifier of the interface 207, an associated interface on the PE 1 that is determined by the PE 1 based on the entry w1 and the first identifier 1::2 includes only the local interface 204, but does not include the non-local interface 207. Therefore, the data packet is prevented from being sent to the PE 2 through the interface 207.

In an example, after receiving the data packet, the PE 1 obtains the first identifier from the data packet, for example, the destination address 1::2 of the data packet, and performs the operations associated with the first identifier 1::2, that is, performs functions associated with the first identifier 1::2. The operations include determining the entry w1 associated with the SID value 1::2 on the PE 1, and determining the local interface 204 in the entry w1. Therefore, the local interface 204 associated with 1::2 is determined such that whether the local interface 204 is in a faulty state is further determined. When the local interface 204 is not in a faulty state, the PE 1 sends the data packet to the CE 1 through the local interface 204, or when the local interface 204 is in a faulty state, the PE 1 avoids sending the data packet to the PE 2, for example, discards the data packet. Referring to the foregoing End.DX2 function, a new End.DX2L function may be defined in the method shown in FIG. 3. For example, the new End.DX2L function is obtained by modifying "forwarding a data packet through an outbound interface associated with an SID" in the End.DX2 function to "forwarding a data packet through a local outbound interface associated with an SID". The PE 1 may pre-store the entry w1. The entry w1 includes the SID value 1::2 and the identifier of the local interface 204, and the entry w1 does not include the identifier of the interface 207 in order to support implementation of the function. After storing the entry w1, the PE 1 may subsequently perform, based on the entry w1, the operations associated with 1::2. The PE 1 may further pre-store instructions included in the operations associated with 1::2 in order to perform the operations associated with the first identifier 12 after obtaining the first identifier from the data packet.

In an example, the PE 1 further stores an entry y1, and the entry y1 includes a SID value 1::1, the identifier of the local interface 204, and the identifier of the interface 207 for sending a data packet to the PE 2 to implement FRR. Therefore, when the PE 3 sends, to the PE 1, a data packet to be sent to the CE 1, a destination address of the data packet is selected as 1::1. The PE 1 first determines a status of the local interface 204 based on the destination address 1::1 and the entry y1. When the local interface 204 is in a faulty state, the PE 1 sends the data packet to the destination address is 2::1 through the non-local interface 207. Similarly, when the PE 3 sends, to the PE 2, the data packet to be sent to the CE 1, the destination address of the data packet is selected as 2::1. The PE 2 first determines a status of the local interface 205 based on the destination address 2::1 and the entry y2. When the local interface 205 is in a faulty state, the PE 2 sends the data packet through the non-local interface 208. When the PE 2 sends the data packet to the PE 1, the destination address of the data packet is selected as the first identifier 1::2. The first identifier 1::2 is associated with the local interface 204 of the PE 1, but is not associated with the non-local interface 207. The PE 1 first determines a status of the local interface 204 based on the destination address 1::2 and the entry w1. When the local interface 204 is in a faulty state, the PE 1 discards the data packet instead of returning the data packet to the PE 2.

Similar to the foregoing descriptions that the PE 1 stores the entry w1, the PE 2 may also store an entry w2. The entry w2 includes a SID value 2::2 and the identifier of the local interface 205. The PE 2 may notify the PE 1 of the SID value 2::2 by sending a second identifier 2::2 to the PE 1. Further, when the PE 1 sends the data packet to the PE 2, the destination address of the data packet may be selected as 2::2. The second identifier 2::2 is associated with the local interface 205 of the PE 2, but is not associated with the non-local interface 208. The PE 2 first determines a status of the local interface 205 based on the destination address 2::2 and the entry w2. When determining that the local interface 205 is in a faulty state, the PE 2 discards the data packet instead of returning the data packet to the PE 1. Therefore, in an active-active mode in which the PE 1 and the PE 2 respectively work in an active mode and a standby mode, the PE 1 and the PE 2 mutually send bypass attribute values, for example, the first identifier and the second identifier, and use the bypass attribute values as destination addresses of the data packet during data packet sending. This avoids a loop problem. Optionally, the entry y1 may include the second identifier 2::2.

In the method shown in FIG. 3, when sending the data packet to the PE 1, the PE 2 adds the first identifier received from the PE 1 to the data packet, for example, uses the first identifier as the destination address of the data packet. Then, the PE 1 obtains the first identifier from the data packet, and determines the local interface 204 that is associated with the first identifier in the data packet. When the local interface 204 is in a faulty state, the PE 1 avoids returning the data packet to the PE 2. This avoids a loop. It can be learned that, in the method shown in FIG. 3, based on transmission and identification of the first identifier, after receiving the data packet including the first identifier, the PE 1 may avoid sending the data packet back to the PE 2 again. Therefore, in an active-active mode, when both the local interfaces of the PE 1 and the PE 2 are in a faulty state, a data packet transmission loop between the PE 1 and the PE 2 can be avoided.

In the method shown in FIG. 3, to implement FRR, the PE 2 sends the data packet that carries the first identifier to the PE 1 through the repair path. When obtaining the first identifier from the received data packet, the PE 1 may determine that the data packet is received through the repair path from the PE 2 to the PE 1. It is equivalent to that the first identifier indicates the repair path from the PE 2 to the PE 1. That is, the first identifier in the data packet indicates that the data packet is from the repair path from the PE 2 to the PE 1. Therefore, the PE 1 avoids returning the data packet to the PE 2, thereby avoiding a loop.

Figure 4:
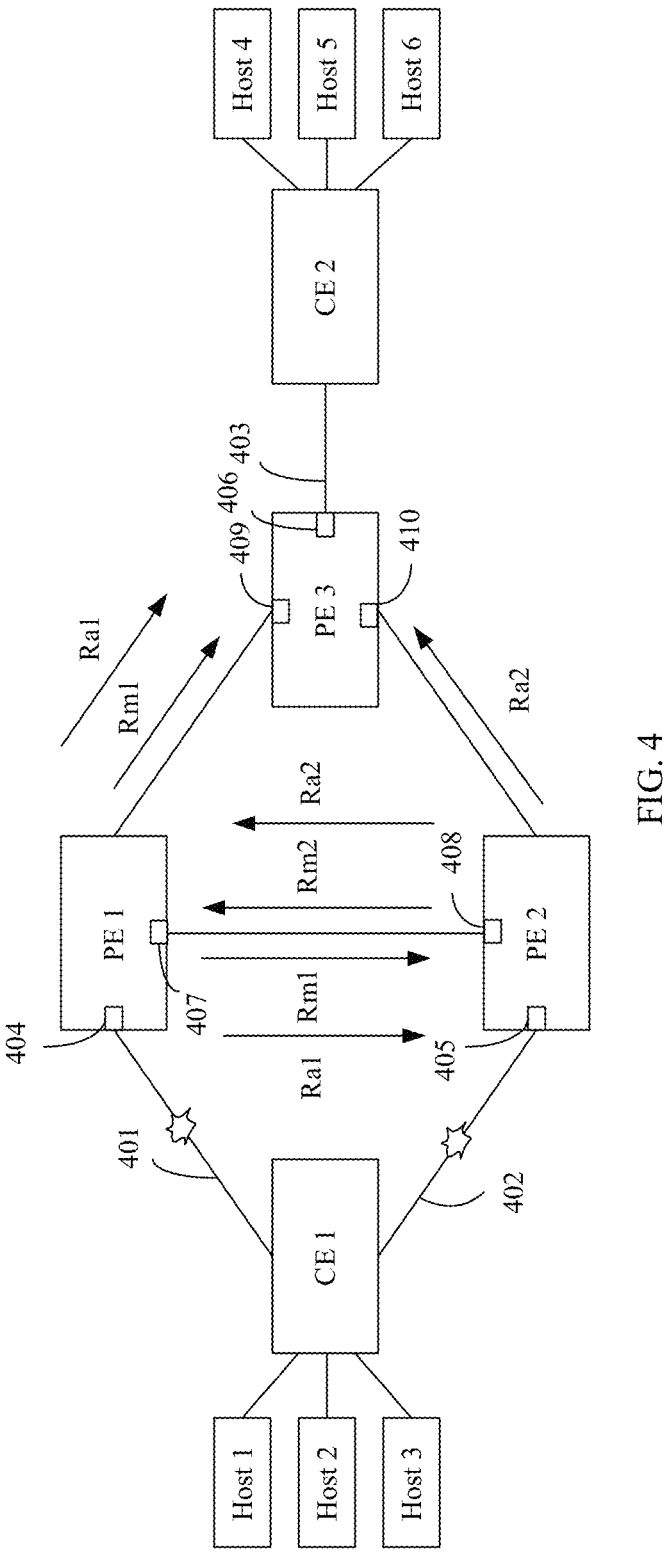
FIG. 4 is a schematic diagram of an SRv6 EVPN active-active scenario according to an embodiment of this application.

FIG. 4 is a schematic diagram of an SRv6 EVPN active-active scenario according to an embodiment of this application. A network shown in FIG. 4 may provide a unicast service in multipoint-to-multipoint (MP2MP) services. The network shown in FIG. 4 includes hosts host 1, host 2, host 3, host 4, host 5, and host 6, CE devices CE 1 and CE 2, and PE devices PE 1, PE 2, and PE 3. The host 1, the host 2, and the host 3 are connected to the CE 1. The host 4, the host 5, and the host 6 are connected to the CE 2. The PE 1, the PE 2, and the PE 3 are respectively connected to the CE 1, the CE 1, and the CE 2 through attachment circuits AC 401, AC 402, and AC 403. The PE 1, the PE 2, and the PE 3 are respectively connected to the AC 401, the AC 402, and the AC 403 through interfaces 404, 405, and 406. The interfaces 404, 405, and 406 are all local interfaces, and interfaces 407 and 408 are non-local interfaces. The PE 1 is connected to the PE 2 through the interface 407, and the PE 2 is connected to the PE 1 through the interface 408. The PE 3 is connected to the PE 1 through an interface 409, and the PE 3 is connected to the PE 2 through an interface 410. In an example, the PE 1, the PE 2, and the PE 3 are configured as follows.

On the PE 1, an ESI attribute value of the interface 404 is an ESI 1, and a SID associated with a unicast service is 1::1. A specific configuration process is, for example, as follows. The ESI attribute value of the interface 404 is set to the ESI 1. A processing module associated with the interface 404 is set as a BD 1. A SID associated with the BD 1 is set to 1::1, to be specific, the SID associated with the processing module BD 1 configured to process unicast service related data on the PE 1 is set to 1::1. It is equivalent to that an SID associated with the unicast service is set to 1::1 on the PE 1.

On the PE 2, an ESI attribute value of the interface 405 is the ESI 1, a processing module associated with the interface 405 is a BD 2, and a data packet processing function on the PE 2 may be completed by the BD 2. A specific configuration process is, for example, as follows. The ESI attribute value of the interface 405 is set to the ESI 1. The processing module associated with the interface 405 is set as the BD 2. A SID associated with the BD 2 is set to 2::1, to be specific, the SID associated with the processing module BD 2 configured to process unicast service related data on the PE 2 is set to 2::1. It is equivalent to that a SID associated with the unicast service is set to 2::1 on the PE 2.

On the PE 3, an ESI attribute value of the interface 406 is an ESI 2, a processing module associated with the interface 406 is a BD 3, and a data packet processing function on the PE 3 may be completed by the BD 3. A specific configuration process is, for example, as follows. The ESI attribute value of the interface 406 is set to the ESI 2. The processing module associated with the interface 406 is set as the BD 3. A SID associated with the BD 3 is set to 3::1, to be specific, the SID associated with the processing module BD 3 configured to process unicast service related data on the PE 3 is set to 3::1. It is equivalent to that an SID associated with the unicast service is set to 3::1 on the PE 3.

In this scenario, to provide a unicast service and an active-active mode, the PE 1, the PE 2, and the PE 3 send a routing message to each other. The routing message may be a BGP message. Referring to the IETF draft "EVPN All Active Usage Enhancement, draft-eastlake-bess-enhance-evpn-all-active-00.txt", how to multi-home one CE device to a plurality of PE devices in an EVPN is described, where the plurality of PE devices are in an all-active mode. The all-active mode may also be referred to as an all-active redundancy mode.

Figure 5:
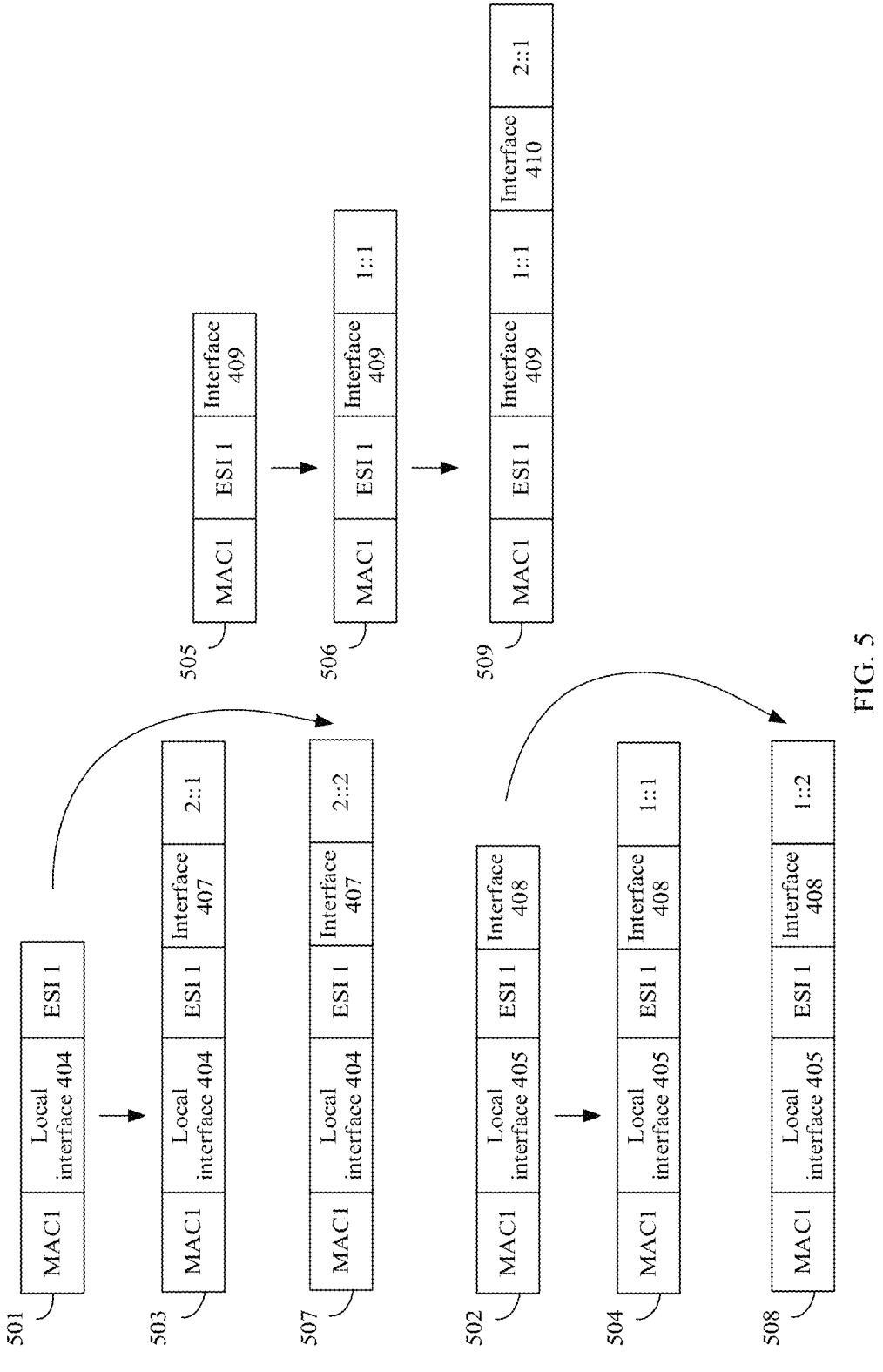
FIG. 5 is a schematic diagram of an entry in a MAC forwarding table according to an embodiment of this application.

FIG. 5 is a schematic diagram of an entry in a MAC forwarding table according to an embodiment of this application. The PE 1, the PE 2, and the PE 3 each may store a MAC forwarding table. In an example, the PE 1 may learn of a MAC address MAC1 of the host 1 from the CE 1 through the local interface 404, and generate an entry 501 in the MAC forwarding table on the PE 1. The entry 501 includes MAC1, an identifier of the local interface 404, and the ESI attribute value ESI 1 of the local interface 404. The PE 1 sends a routing message Rm1 to the PE 2 and the PE 3. The routing message Rm1 includes the entry 501 and a virtual local area network redirect extended community "VLAN-Redirect-Extended Community" attribute described in the foregoing draft "EVPN All Active Usage Enhancement, draft-eastlake-bess-enhance-evpn-all-active-00.txt".

In an example, after receiving the routing message Rm1, the PE 2 may find, based on the ESI 1 in the entry 501, a local interface of the PE 2, that is, the interface 405 through which the PE 2 is connected to the CE 1, and generate an FRR entry 502, that is, an entry 502 in the MAC forwarding table on the PE 2. The entry 502 includes MAC1, an identifier of the local interface 405 for sending a data packet to the CE 1 through an active path, the ESI 1, and an identifier of the interface 408 for sending a data packet to the CE 1 through a repair path. The active path is: PE 2->local interface 405->CE 1. The repair path is: PE 2->interface 408->PE 1->CE 1, that is, the repair path is: PE 2->PE 1->CE 1. In this application, the repair path may also be referred to as a standby path.

The PE 2 may send a routing message Ra2 to the PE 1 and the PE 3, and the routing message Ra2 includes an AD route A2 and an SRv6-VPN SID attribute whose "type" is 2. The AD route A2 includes an ESI field, and a value of the ESI field in the AD route A2 is the ESI attribute value ESI 1 of the interface 405 that is set on the PE 2. In the scenario shown in FIG. 4, a value of the SRv6-VPN SID attribute whose "type" is 2 is referred to as a unicast attribute value below. The unicast attribute value may be used to notify a peer device of an SID that is set on a local device and that is associated with a unicast service. The unicast attribute value in the routing message Ra2 is the SID value 2::1 that is set on the PE 2 and that is associated with the unicast service.

The PE 1 receives, through the interface 407, the routing message Ra2 sent by the PE 2, and determines that the ESI 1 in the routing message Ra2 is the same as the ESI 1 in the entry 501 generated by the PE 1 such that the PE 1 determines that the PE 2 is an alternate device of the PE 1. Referring to FIG. 5, the PE 1 generates an entry 503 based on the entry 501, the interface 407 that receives the routing message Ra2, and the unicast attribute value 2::1 in the routing message Ra2. The entry 503 includes MAC1, the identifier of the local interface 404, the ESI 1, an identifier of the interface 407, and 2::1.

Similarly, the PE 1 may send a routing message Ra1 to the PE 2 and the PE 3, and the routing message Ra1 includes an AD route A1 and a unicast attribute. The AD route A1 includes an ESI field, and a value of the ESI field in the AD route A1 is the ESI attribute value ESI 1 of the interface 404 that is set on the PE 1. A unicast attribute value in the routing message Ra1 is the SID value 1::1 that is set on the PE 1 and that is associated with the unicast service. The PE 2 receives, through the interface 408, the routing message Ra1 sent by the PE 1, and determines that the ESI 1 in the routing message Ra1 is the same as the ESI 1 in the entry 502 generated by the PE 2 such that the PE 2 determines that the PE 1 is an alternate device of the PE 2. Referring to FIG. 5, the PE 2 generates an entry 504 based on the entry 502 and the unicast attribute value 1::1 in the routing message Ra1. The entry 504 includes MAC1, the identifier of the local interface 405, the ESI 1, the identifier of the interface 408, and 1::1.

After receiving, through the interface 409, the routing message Rm1 sent by the PE 1, the PE 3 may generate an entry 505 in the MAC forwarding table on the PE 3. The entry 505 includes MAC1, the ESI 1, and an identifier of the interface 409.

After receiving, through the interface 409, the routing message Ra1 sent by the PE 1, the PE 3 may determine that the ESI in the routing message Ra1 is the same as the ESI in the entry 505 generated by the PE 3, and may generate an entry 506 based on the entry 505 and the unicast attribute value 1::1 in the routing message Ra1. The entry 506 includes MAC1, the ESI 1, the identifier of the interface 409, and 1::1. After receiving, through the interface 410, the routing message Ra2 sent by the PE 2, the PE 3 may determine that the ESI in the routing message Ra2 is the same as the ESI in the entry 506, that is, the ESI in the routing message Ra1 received from the PE 1. Therefore, the PE 3 may determine that the local interface of the PE 2 and the local interface of the PE 1 belong to a same Ethernet segment. That is, it may be determined that the PE 2 is an alternate device of the PE 1. The PE 3 may generate an entry 509 based on the entry 506 and the unicast attribute value 2::1 in the routing message Ra2. The entry 509 includes MAC1, the ESI 1, the identifier of interface 409, 1::1, an identifier of the interface 410, and 2::1. When receiving a data packet whose destination MAC address is MAC1 and that is forwarded by the CE 2, the PE 3 may search the MAC forwarding table based on MAC1, and select to send the data packet to the PE 1 or the PE 2 based on the entry 509. The PE 3 may set the destination address of the data packet to 1::1, and send the data packet whose destination address is 1::1 to the PE 1 through the interface 409 in order to trigger the PE 1 to provide a unicast service, that is in order to trigger the PE 1 to forward the data packet to the CE 1. The PE 3 may alternatively set the destination address of the data packet to 2::1, and send the data packet whose destination address is 2::1 to the PE 2 through the interface 410 in order to trigger the PE 2 to provide a unicast service, that is in order to trigger the PE 2 to forward the data packet to the CE 1.

When receiving the data packet whose destination address is 2::1 and destination MAC address is MAC1 and that is forwarded by the PE 3, the PE 2 performs operations associated with the SID value 2::1. For details about the operations associated with the SID value in this scenario, refer to an End.DT2U function described in section 4.6 of the IETF draft "SRv6 Network Programming, draft-filsfils-spring-srv6-network-programming-04". The End.DT2U function includes forwarding a data packet through an interface in an entry that matches a destination MAC address. Based on the End. DT2U function, the operations associated with the SID value 2::1 on the PE 2 include sending the data packet through the local interface 405 and the interface 408 in the entry 504 that matches MAC1. The operations associated with the SID value 1::1 on the PE 1 include sending the data packet through the local interface

404 and the interface 407 in the entry 503 that matches MAC1. Referring to FIG. 5, the entry 504 includes the identifier of the local interface 405, the identifier of the interface 408, and 1::1. The PE 2 first determines whether the local interface 405 is in a faulty state. When the local interface 405 is not in a faulty state, the PE 2 sends the data packet to the CE 1 through the local interface 405, or when the local interface 405 is in a faulty state, the PE 2 sends the data packet whose destination address is 1::1 to the PE 1 through the interface 408 in order to trigger the PE 1 to forward the data packet to the CE 1.

After receiving the data packet whose destination address is 1::1 and destination MAC address is MAC1 and that is sent by the PE 2, the PE 1 performs operations associated with the SID value 1::1. The associated operations include sending the data packet through the local interface 404 and the interface 407 in the entry 503 that matches MAC1. Referring to FIG. 5, the entry 503 includes the identifier of the local interface 405, the identifier of the interface 408, and 2::1. The PE 1 first determines whether the local interface 404 is in a faulty state. When the local interface 404 is not in a faulty state, the PE 1 sends the data packet to the CE 1 through the local interface 404, or when the local interface 404 is in a faulty state, the PE 1 sends the data packet whose destination address is 2::1 to the PE 2 through the interface 407 in order to trigger the PE 2 to forward the data packet to the CE 1. In this case, the data packet sent by the PE 2 is sent back by the PE 1 to the PE 2. Consequently, a data packet transmission loop is caused. After receiving a route withdrawal notification, the PE 3 stops sending a new data packet to the PE 2 such that the loop can be stopped. The caused loop can be eliminated only after the PE 1 or the PE 2 receives the route withdrawal notification and withdraws a respective route.

FIG. 6 is a flowchart of a communications method according to an embodiment of this application in the scenario shown in FIG. 4.

S601: The PE 1 sends a first identifier to the PE 2 through the interface 407.

The first identifier is a bypass attribute value, for example, 1::2.

In an example, the foregoing routing message Ra1 sent by the PE 1 to the PE 2 may carry a bypass attribute, "type" type in the bypass attribute is 3, and a bypass attribute value of the bypass attribute is 1::2.

The PE 2 receives, through the interface 408, the first identifier sent by the PE 1. In an example, the PE 2 may receive, through the interface 408, the routing message Ra1 sent by the PE 1. The routing message Ra1 includes the AD route A1 and the first identifier. The value of the ESI field in the AD route A1 is the ESI attribute value ESI 1 of the interface 404 that is set on the PE 1, and the first identifier is 1::2. The PE 2 determines that the ESI 1 in the routing message Ra1 is the same as the ESI 1 in the entry 502 generated by the PE 2 such that the PE 2 can determine that the PE 1 is an alternate device of the PE 2. Referring to FIG. 5, the PE 2 generates the entry 508 based on the entry 502 and the routing message Ra1. The entry 508 includes MAC1, the identifier of the local interface 405, the ESI 1, the identifier of the interface 408, and 1::2, where 1::2 is the first identifier in the routing message Ra1. The PE 2 may send the data packet based on the entry 508 through the local interface 405 such that an active path is selected to send the data packet to the CE 1. The active path is PE 2->local interface 405->CE 1. The PE 2 may send the data packet based on the entry 508 through the interface 408 such that a repair path is selected to send the data packet to the CE 1. The repair path is: PE 2->PE 1->CE 1, to be specific, the repair path is: PE 2->interface 408->PE 1->CE 1. When sending the data packet through the interface 408, the PE 2 may add the first identifier 1::2 to the data packet.

Similarly, the PE 1 may receive, through the interface 407, the routing message Ra2 sent by the PE 2. The routing message Ra2 includes the AD route A2 and the second identifier. The second identifier is, for example, 2::2. The PE 1 determines that the ESI 1 in the routing message Ra2 is the same as the ESI 1 in the entry 501 generated by the PE 1 such that the PE 1 can determine that the PE 2 is an alternate device of the PE 1. Referring to FIG. 5, similar to the foregoing process in which the PE 2 generates the entry 508, the PE 1 may generate the entry 507 based on the entry 501 and the routing message Ra2. The entry 507 includes MAC1, the identifier of the local interface 404, the ESI 1, the identifier of the interface 407, and 2::2, where 2::2 is the second identifier in the routing message Ra2.

In the entries 501, 502, 503, 504, 505, 506, 507, 508, and 509 shown in FIG. 5, the identifiers of the local interfaces all may be tagged to identify an identifier of a local interface in a found entry. For example, a tag is added to an entry to indicate that an identifier of a specific interface is an identifier of a local interface.

S602: The PE 1 receives, through the interface 407, the data packet sent by the PE 2, where the data packet includes the first identifier.

A manner in which the data packet includes the first identifier is, for example, that a destination address of the data packet is the first identifier. The destination address of the data packet may be an IPV6 address. In an example, the data packet further has a destination MAC address, for example, MAC1.

The PE 2 may send the data packet to the PE 1 through the interface 408. As described above, when the PE 2 sends the data packet to the CE 1, there may be two paths to be selected. One path is an active path: PE 2->local interface 405->CE 1. The other path is a repair path: PE 2->interface 408->PE 1->CE 1.

In an example, the PE 2 first determines whether the local interface 405 is in a faulty state. When the local interface 405 is not in a faulty state, in response to determining that the local interface 405 is in a normal state or is not in a faulty state, the PE 2 may send the data packet to the CE 1 through the local interface 405, or when the local interface 405 is in a faulty state, in response to determining that the local interface 405 is in a faulty state, the PE 2 may send the data packet including the first identifier to the PE 1 through the interface 408.

In an example, the PE 2 receives the data packet sent by the PE 3, and the destination address of the data packet is a unicast attribute value carried in the routing message R2 sent by the PE 2 to the PE 3, for example, 2::1. A destination MAC address of the data packet is MAC1. A process in which the PE 3 sends a data packet to the PE 2 is described above. Subsequently, the PE 2 performs, based on the destination address 2::1 of the data packet, the operations associated with the SID value 2::1. For the associated operations, refer to the foregoing End.DT2U function. The operations include sending the data packet through the local interface 405 and the interface 408 in the entry 508 that matches MAC1. For example, the associated operations include searching a MAC forwarding table of the PE 2 for the entry 508 that matches MAC1, determining the local interface 405 based on the identifier of the local interface 405 in the entry 508, determining whether the local interface 405 is in a faulty state, and in response to determining that the local interface 405 is in a faulty state, determining the interface 408 based on the identifier of the interface 408 in the entry 508, and sending the data packet to the PE 1 through the interface 408 to send the data packet through the repair path. The destination address of the data packet is set to the SID value 1::2 in the entry 508.

S603: The PE 1 determines that the interface 404 associated with the first identifier in the data packet is in a faulty state.

S604: In response to that the PE 1 determines that the interface 404 is in a faulty state, the PE 1 avoids sending the data packet to the PE 2 through the interface 407.

After receiving the data packet, the PE 1 obtains the first identifier from the data packet. The first identifier is, for example, the destination address 1::2 of the data packet. The data packet may further include the destination MAC address MAC1. The PE 1 determines whether the local interface 404 associated with the first identifier 1::2 is in a faulty state. For example, the PE 1 performs the operations associated with the SID value 1::2. The associated operations include searching the MAC forwarding table of the PE 1 for the entry 507 that matches MAC1, and determining the local interface 404 based on the identifier of the local interface 404 in the entry 507. Therefore, the local interface 404 associated with 1::2 is determined. In response to determining that the local interface 404 is not in a faulty state, the PE 1 sends the data packet to the CE 1 through the local interface 404. In response to determining that the local interface 404 is in a faulty state, the PE 1 avoids sending the data packet to the PE 2 through the interface 407. Therefore, when both the interface 404 and the interface 405 are in a faulty state, the PE 1 avoids sending, back to the PE 2 again, the data packet sent by the PE 2. This avoids a loop. A manner in which the PE 1 avoids sending the data packet to the PE 2 through the interface 407 is: discarding the data packet received from the PE 2. In the method shown in FIG. 6, a new End.DT2UL function may be defined. For example, the new End.DT2UL function is obtained by modifying "forwarding a data packet through an entry that matches a destination MAC address" in the End.DT2U function to "forwarding a data packet through a local interface in an entry that matches a destination MAC address". For the operations associated with the first identifier 1::2 on the PE 1, refer to the End.DT2UL function.

In an example, the entry 507 stored by the PE 1 includes MAC1, the identifier of the local interface 404, the ESI 1, the identifier of the interface 407 for sending a data packet to the PE 2 to implement FRR, and the SID value 2::2. Therefore, the PE 3 may send, to the PE 1, the data packet to be sent to the CE 1. The destination address of the data packet is selected as 1::1. After receiving the data packet whose destination address is 1::1 and destination MAC address is MAC1 and that is sent by the PE 3, the PE 1 performs operations associated with the SID value 1::1. The associated operations are similar to the foregoing operations that are associated with the SID value 2::1 and that are performed by the PE 2 after the PE 2 receives the data packet sent by the PE 3. In the associated operations, the PE 1 first determines a status of the local interface 404, and when the local interface 404 is not in a faulty state, the PE 1 sends the data packet to the local interface 404, or when the local interface 404 is in a faulty state, the PE 1 sends the data packet to the PE 2 through the non-local interface 407. That is, the PE 3 may send the data packet to the PE 1 using the destination address 1::1. The destination address 1::1 is associated with the local interface 404 on the PE 1 and the non-local interface 407 that is used for implementing FRR.

The PE 3 may alternatively send the data packet to the PE 2 using the destination address 2::1. The destination address 2::1 is associated with the local interface 405 on the PE 2 and the non-local interface 408 that is used for implementing FRR.

Further, after receiving the data packet from the PE 3, the PE 1 sends the data packet to the PE 2 through the repair path using the second identifier 2::2 received from the PE 2. After receiving the data packet from the PE 1, the PE 2 obtains the second identifier. When determining an interface associated with the second identifier 2::2, the PE 2 obtains the identifier of the local interface 405, but does not obtain the non-local interface 408 that is not associated with 2::2 such that the PE 2 does not return the data packet to the PE 1. Similarly, after receiving the data packet from the PE 3, the PE 2 sends the data packet to the PE 1 through the repair path using the first identifier 1::2 received from the PE 1. After receiving the data packet from the PE 2, the PE 1 obtains the first identifier. When determining an interface associated with the first identifier 1::2, the PE 1 obtains the identifier of the local interface 404, but does not obtain the non-local interface 407 that is not associated with the 1::2 such that the PE 1 does not return the data packet to the PE 2. Therefore, in an active-active mode in which the PE 1 and the PE 2 respectively work in an active mode and a standby mode, the PE 1 and the PE 2 mutually send bypass attribute values, for example, the first identifier and the second identifier, and use the bypass attribute values as destination addresses of the data packet during data packet sending. This avoids a loop problem.

Similar to the method shown in FIG. 3, in the method shown in FIG. 6, based on transmission and identification of the first identifier, after receiving the data packet including the first identifier, the PE 1 may avoid sending the data packet back to the PE 2 again. Therefore, in an active-active mode, when both the local interfaces of the PE 1 and the PE 2 are in a faulty state, a data packet transmission loop between the PE 1 and the PE 2 is avoided.

Similar to the method shown in FIG. 3, in the method shown in FIG. 6, when obtaining the first identifier from the received data packet, the PE 1 may determine that the data packet is received through the repair path from the PE 2 to the PE 1. It is equivalent to that the first identifier indicates the repair path from the PE 2 to the PE 1, that is, the first identifier in the data packet indicates that the data packet is from the repair path from the PE 2 to the PE 1. Therefore, the PE 1 avoids returning the data packet to the PE 2, thereby avoiding a loop.

Figure 7:
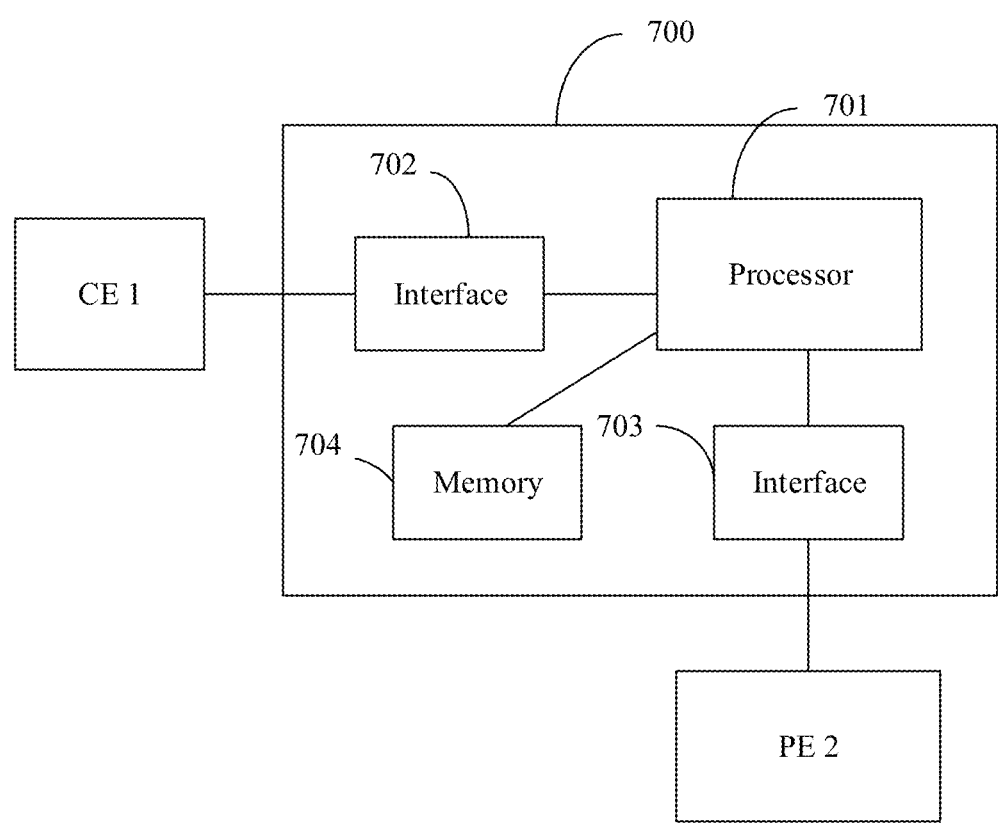
FIG. 7 is a schematic structural diagram of a communications device according to an embodiment of this application.

FIG. 7 is a schematic structural diagram of a communications device 700 according to an embodiment of this application. As shown in FIG. 7, the communications device 700 includes a processor 701, an interface 702, and an interface 703. The interface 702 is a local interface, and the interface 703 is a non-local interface. The communications device 700 may be the PE 1 in FIG. 2 or FIG. 4, and is connected to a CE 1 through the interface 702 and connected to a PE 2 through the interface 703. The communications device 700 may further include an interface configured to implement a connection to a PE 3. The communications device 700 shown in FIG. 7 may perform the method performed by the PE 1 shown in FIG. 3, and the interface 702 and the interface 703 may be respectively the interface 204 and the interface 207 shown in FIG. 2. Alternatively, the communications device 700 shown in FIG. 7 may perform the method performed by the PE 1 shown in FIG. 6, and the interface 702 and the interface 703 may be respectively the interface 404 and the interface 407 shown in FIG. 4.

The processor 701 may send a first identifier to the PE 2 through the interface 703. For details, refer to descriptions that the PE 1 sends the first identifier to the PE 2 through the interface 207 in S301 and the descriptions that the PE 1 sends the first identifier to the PE 2 through the interface 407 in S601.

The processor 701 may further receive, through the interface 703, a data packet that is sent by the PE 2 and that includes the first identifier. For details, refer to descriptions that the PE 1 receives, through the interface 207, the data packet sent by the PE 2 in S302 and the descriptions that the PE 1 receives, through the interface 407, the data packet sent by the PE 2 in S602.

After receiving the data packet including the first identifier, the processor 701 may determine whether the interface 702 associated with the first identifier in the data packet is in a faulty state. In response to determining that the interface 702 is in a faulty state, the processor 701 avoids sending the data packet to the PE 2 through the interface 703. For details, refer to the descriptions that the PE 1 determines that the interface 204 associated with the first identifier in the data packet is in a faulty state, and in response to determining that the interface 204 is in a faulty state, the PE 1 avoids sending the data packet to the PE 2 through the interface 207 in S303 and S304, and refer to the descriptions that the PE 1 determines that the interface 404 associated with the first identifier in the data packet is in a faulty state, and in response to determining that the interface 404 is in a faulty state, the PE 1 avoids sending the data packet to the PE 2 through the interface 407 in S603 and S604.

The communications device 700 may further include a memory 704, and the memory 704 is configured to store a first entry. The first entry includes the first identifier and an identifier of the interface 702, but does not include an identifier of the interface 703. For descriptions that the memory 704 stores the first entry, refer to the descriptions that the PE 1 stores the entry w1 in S303 and S304. The processor 701 may determine the interface 702 based on the first entry and the first identifier that is in the data packet. For details, refer to the descriptions that the PE 1 determines the local interface 204 based on the entry w1 and the first identifier 1::2 that is in the data packet in S303 and S304.

The processor 701 may perform operations associated with the first identifier. The operations include searching a MAC forwarding table for a second entry that matches a destination MAC address MAC1 of the data packet, determining the interface 702 based on an identifier, in the second entry, of an interface configured to implement a connection to a CE device, and determining that the interface 702 is in a faulty state. For details, refer to the descriptions that the PE 1 performs the operations associated with the first identifier 1::2 in S603 and S604. The second entry is the entry 507. The MAC forwarding table may be stored in the memory 704, or stored in a memory other than the memory 704.

A manner in which the processor 701 avoids sending the data packet to the PE 2 includes discarding the data packet. For details, refer to the descriptions that the PE 1 avoids sending the data packet to the PE 2 through the interface 207 in S303 and S304, and refer to the descriptions that the PE 1 avoids sending the data packet to the PE 2 through the interface 407 in S603 and S604.

Figure 8:
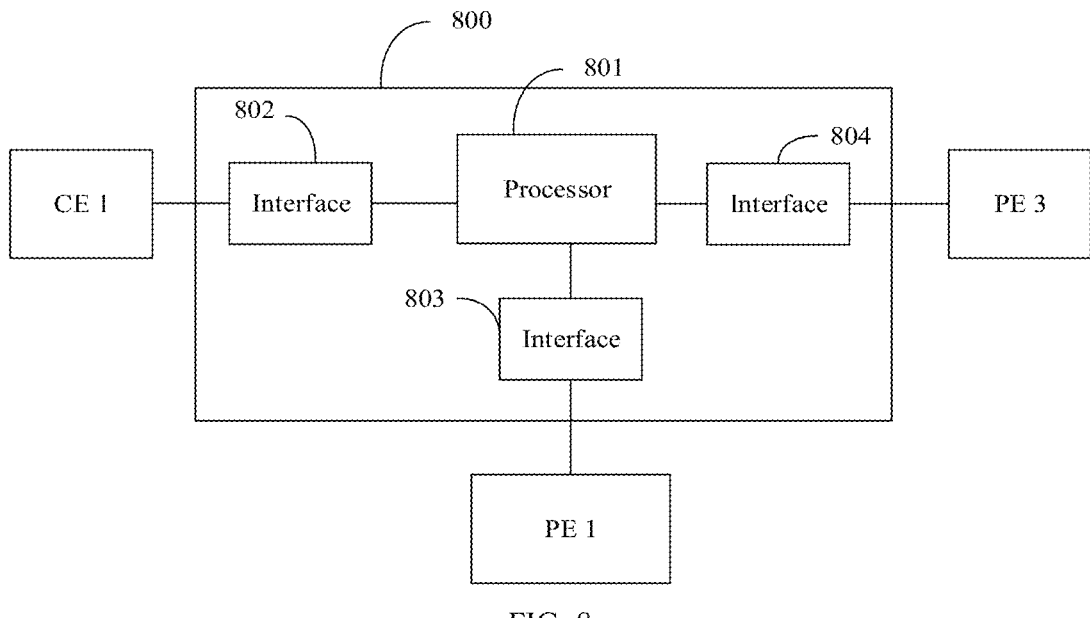
FIG. 8 is a schematic structural diagram of a communications device according to an embodiment of this application.

FIG. 8 is a schematic structural diagram of a communications device 800 according to an embodiment of this application. As shown in FIG. 8, the communications device 800 includes a processor 801, an interface 802, and an interface 803. The interface 802 is a local interface, and the interface 803 is a non-local interface. The communications device 800 may be the PE 2 in FIG. 2 or FIG. 4, and is connected to a CE 1 through the interface 802 and connected to a PE 1 through the interface 803. The communications device 800 may further include an interface 804 configured to implement a connection to a PE 3. The communications device 800 shown in FIG. 8 may perform the method performed by the PE 2 shown in FIG. 3, and the interface 802 and the interface 803 may be respectively the interface 205 and the interface 208 shown in FIG. 2. Alternatively, the communications device 800 shown in FIG. 8 may perform the method performed by the PE 2 shown in FIG. 6, and the interface 802 and the interface 803 may be respectively the interface 405 and the interface 408 shown in FIG. 8.

The processor 801 may receive a first identifier sent by the PE 1, and send a data packet including the first identifier to the PE 1.

The processor 801 may receive a data packet sent by the PE 3, determine whether the interface 802 is in a faulty state, and in response to determining that the interface 802 is in a faulty state, send the data packet including the first identifier to the PE 1.

For details about the operations performed by the processor 801, refer to the operations performed by the PE 2 in S301, S302, S303, and S304, and refer to the operations performed by the PE 2 in S601, S602, S603, and S604.

The processor 701 and the processor 801 each may be a central processing unit (CPU), a network processor (NP), or a combination of the CPU and the NP.

The communications device 700 and the communications device 800 each may include a memory configured to store a computer program instruction. When the processor 701 and the processor 801 each execute the computer program instruction stored in the memory, the communications device 700 and the communications device 800 are enabled to respectively perform the methods performed by the PE 1 and the PE 2 shown in FIG. 3, or respectively perform the methods performed by the PE 1 and the PE 2 shown in FIG. 6. The memory that stores the computer program instruction in the communications device 700 may be the memory 704, or may be a memory different from the memory 704.

The memory 704 in the communications device 700 and the memory configured to store the computer program instruction in each of the communications device 700 and the communications device 800 may include a volatile memory, for example, a random-access memory (RAM), or may include a nonvolatile memory, for example, a read-only memory (ROM), a flash memory, a hard disk drive (HDD), or a solid-state drive (SSD). In an example, in the communications device 700, the memory 704 may be integrated into the processor 701, and the memory that is configured to store the computer program instruction may also be integrated into the processor 701. In the communications device 800, the memory that is configured to store the computer program instruction may also be integrated into the processor 801.

The interfaces 702, 703, 802, 803, and 804 may be Ethernet interfaces.

Figure 9:
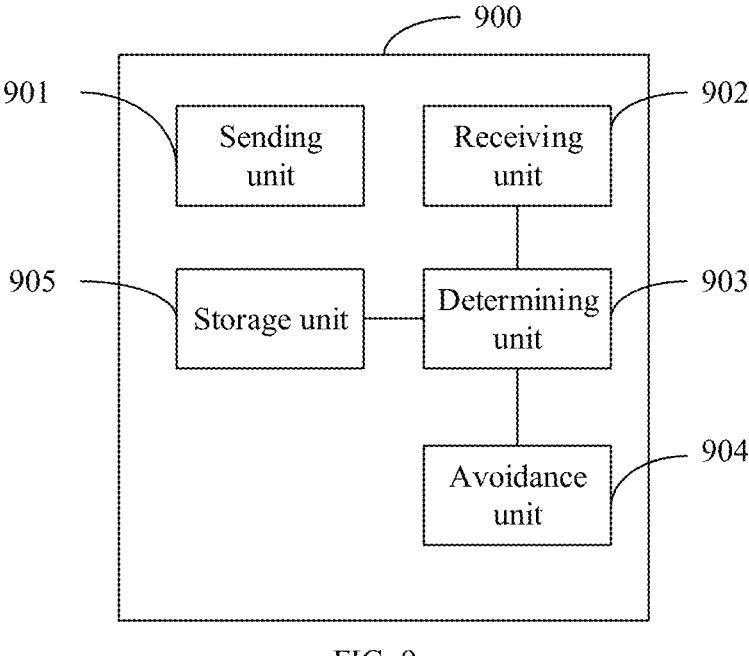
FIG. 9 is a schematic structural diagram of a communications device according to an embodiment of this application.

FIG. 9 is a schematic structural diagram of a communications device 900 according to an embodiment of this application. As shown in FIG. 9, the communications device 900 includes a sending unit 901, a receiving unit 902, a determining unit 903, and an avoidance unit 904. The communications device 900 is connected to a PE device PE 2 and a CE device CE 1, and may be the PE 1 in FIG. 2 to perform the method performed by the PE 1 shown in FIG. 3, Alternatively, the communications device 900 may be the PE 1 in FIG. 4 to perform the method performed by the PE 1 shown in FIG. 6.

The sending unit 901 may send a first identifier to the PE 2 through an interface configured to implement a connection to the PE 2, for example, an interface 204 or an interface 404. For details, refer to descriptions that the PE 1 sends the first identifier to the PE 2 through the interface 207 in S301 and the descriptions that the PE 1 sends the first identifier to the PE 2 through the interface 407 in S601.

The receiving unit 902 may receive, through the interface configured to implement the connection to the PE 2, a data packet that is sent by the PE 2 and that includes the first identifier. For details, refer to descriptions that the PE 1 receives, through the interface 207, the data packet sent by the PE 2 in S302 and the descriptions that the PE 1 receives, through the interface 407, the data packet sent by the PE 2 in S602.

The determining unit 903 may determine that an interface that is configured to implement a connection to the CE 1 and that is associated with the first identifier in the data packet is in a faulty state. In response to that the determining unit 903 determines that the interface that is configured to implement the connection to the CE 1 is in a faulty state, the avoidance unit 904 may avoid sending the data packet to the PE 2 through the interface that is configured to implement the connection to the CE 1. For details, refer to the descriptions that the PE 1 determines that the interface 204 associated with the first identifier in the data packet is in a faulty state, and in response to determining that the interface 204 is in a faulty state, the PE 1 avoids sending the data packet to the PE 2 through the interface 207 in S303 and S304, and refer to the descriptions that the PE 1 determines that the interface 404 associated with the first identifier in the data packet is in a faulty state, and in response to determining that the interface 404 is in a faulty state, the PE 1 avoids sending the data packet to the PE 2 through the interface 407 in S603 and S604.

The communications device 900 may further include a storage unit 905, and the storage unit 905 may store a first entry. The first entry includes the first identifier and an identifier of the interface that is configured to implement the connection to the CE 1, but does not include an identifier of the interface that is configured to implement the connection to the PE 2. For descriptions that the storage unit 905 stores the first entry, refer to the descriptions that the PE 1 stores the entry w1 in S303 and S304.

The determining unit 903 may determine, based on the first entry and the first identifier that is in the data packet, the interface that is configured to implement the connection to the CE 1. For details, refer to the descriptions that the PE 1 determines the local interface 204 based on the entry w1 and the first identifier 1::2 that is in the data packet in S303 and S304.

The determining unit 903 may be configured to perform operations associated with the first identifier. The operations include searching a MAC forwarding table for a second entry that matches a destination MAC address MAC1 of the data packet, determining the interface that is configured to implement the connection to the CE 1, based on an identifier, in the second entry, of an interface configured to implement a connection to the CE device, and determining that the interface is in a faulty state. For details, refer to the descriptions that the PE 1 performs the operations associated with the first identifier 1::2 in S603 and S604. The second entry is the entry 507.

A manner in which the avoidance unit 904 avoids sending the data packet to the PE 2 includes discarding the data packet. For details, refer to the descriptions that the PE 1 avoids sending the data packet to the PE 2 through the interface 207 in S303 and S304, and refer to the descriptions that the PE 1 avoids sending the data packet to the PE 2 through the interface 407 in S603 and S604.

Figure 10:
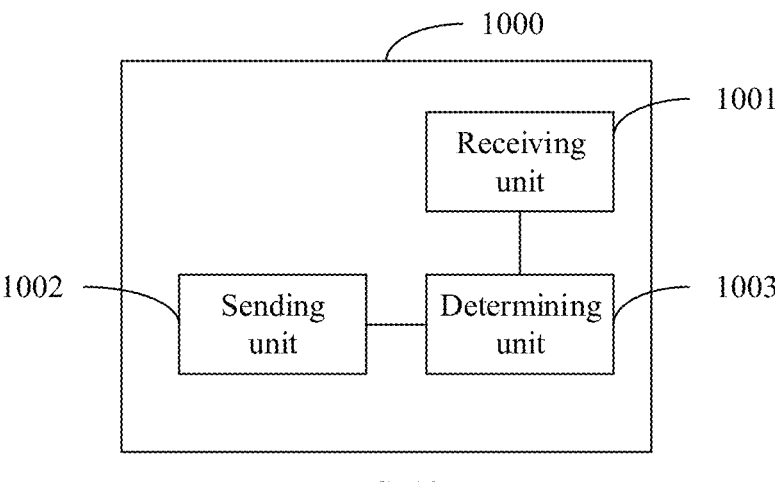
FIG. 10 is a schematic structural diagram of a communications device according to an embodiment of this application.

FIG. 10 is a schematic structural diagram of a communications device 1000 according to an embodiment of this application. As shown in FIG. 10, the communications device 1000 includes a receiving unit 1001 and a sending unit 1002. The communications device 1000 is connected to a PE device PE 1 and a CE device CE 1. The communications device 1000 may be the PE 2 in FIG. 2 to perform the method performed by the PE 2 shown in FIG. 3. Alternatively, the communications device 1000 may be the PE 2 in FIG. 4 to perform the method performed by the PE 2 shown in FIG. 6.

The receiving unit 1001 may receive a first identifier sent by the PE 1. The sending unit 1002 may send a data packet including the first identifier to the PE 1.

The communications device 1000 may further include a determining unit 1003. The receiving unit 1001 receives a data packet sent by a PE 3. In response to receiving the data packet sent by the PE 3, the determining unit 1003 determines whether an interface configured to implement a connection to the CE 1 is in a faulty state. In response to determining that the interface configured to implement the connection to the CE 1 is in a faulty state, the data packet including the first identifier is sent to the PE 1.

For details about the operations performed by the receiving unit 1001, the sending unit 1002, and the determining unit 1003, refer to the operations performed by the PE 2 in S301, S302, S303, and S304, and refer to the operations performed by the PE 2 in S601, S602, S603, and S604.

Figure 11:
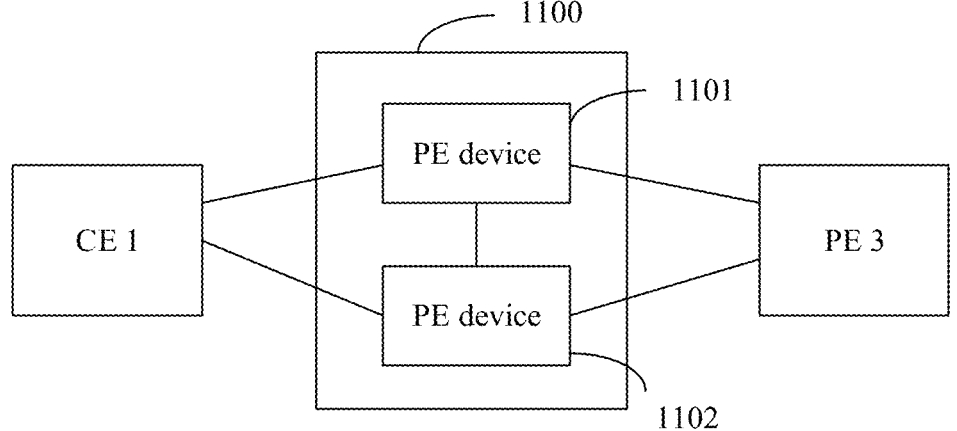
FIG. 11 is a schematic structural diagram of a communications system according to an embodiment of this application.

FIG. 11 is a schematic structural diagram of a communications system 1100 according to an embodiment of this application. The communications system 1100 includes a PE device 1101 and a PE device 1102. The PE device 1101 is connected to the PE device 1102. The PE device 1101 may be the communications device 700 shown in FIG. 7 or the communications device 900 shown in FIG. 9. The PE device 1101 may be connected to a CE device CE 1, and may also be connected to a PE device PE 3. The PE device 1102 may be the communications device 800 shown in FIG. 8 or the communications device 1000 shown in FIG. 10. The PE device 1102 may be connected to the CE 1, and may also be connected to the PE 3.

Reference may be made to each other for the embodiments of this application. Same or similar steps and nouns are not described one by one again.

All or some of the embodiments of this application may be implemented through software, hardware, firmware, or any combination thereof. When the software is used to implement the embodiments, the embodiments may be implemented all or partially in a form of a computer program product. The computer program product includes one or more computer program instructions. When the computer program instructions are loaded and executed on a computer, the procedure or the functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer program instructions may be transmitted from one website, computer, server, or data center to another website, computer, server, or data center in a wired or wireless manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive), or the like.

What is claimed is:

1. A communications method implemented by a first provider edge (PE) device and comprising:
   sending a segment identifier (SID) to a second PE device, wherein an operation associated with the SID comprises forwarding a data packet through a second interface of the first PE device, wherein the first PE device and the second PE device are connected to a customer edge (CE) device in an all-active mode, wherein the first PE device is connected to the CE device through the second interface, and wherein the first PE device is connected to the second PE device through a first interface of the first PE device;
   receiving the data packet from the second PE device via the first interface, wherein the data packet comprises a destination address that is the SID; and
   avoiding sending the data packet via the first interface when the second interface is in a faulty state.

2. The communications method of claim 1, further comprising storing an entry comprising the SID and a second identifier of the second interface, wherein the entry does not comprise a first identifier of the first interface.

3. The communications method of claim 1, further comprising discarding the data packet when the second interface is in the faulty state.

4. The communications method of claim 1, wherein the first PE device is in a Segment Routing over Internet Protocol version 6 (SRv6) Ethernet virtual private network (EVPN).

5. The communications method of claim 1, wherein sending the SID to the second PE device comprises sending, to the second PE device, a routing message comprising the SID.

6. The communications method of claim 5, wherein the routing message is a Border Gateway Protocol (BGP) message comprising an attribute, and wherein the attribute comprises the SID.

7. The communications method of claim 6, wherein the attribute is a Segment Routing over Internet Protocol version 6 (SRv6) virtual private network (VPN) SID attribute.

8. The communication method of claim 6, wherein the BGP message advertises an Ethernet auto-discovery (A-D) route.

9. The communications method of claim 6, wherein the attribute instructs the second PE device to add the SID to the data packet when sending the data packet to the first PE device.

10. The communications method of claim 1, wherein the SID is a Segment Routing over Internet Protocol version 6 (SRv6) SID.

11. The communications method of claim 10, wherein the SRv6 SID is associated with an Ethernet virtual private line (EVPL) service on the first PE device.

12. The communications method of claim 10, wherein the SID is an End.DX2L SID.

13. The communications method of claim 12, wherein a function of the End.DX2L SID is associated with forwarding the data packet through a local outbound interface associated with the SID.

14. The communications method of claim 1, wherein the SID is an End.DT2UL SID.

15. The communications method of claim 14, wherein a function of the End.DT2UL SID is associated with forwarding the data packet through a local interface in an entry.

16. The communications method of claim 1, wherein a function of the SID is:

forwarding the data packet or another data packet through an outbound interface associated with the SID; or forwarding the data packet or another data packet through a local interface in an entry that matches a destination medium access control (MAC) address.

17. A first provider edge (PE) device comprising:

a first interface configured to connect to a second PE device;

a second interface configured to connect to a customer edge (CE) device that is multi-homed to the first PE device and the second PE device in an all-active mode, wherein an operation associated with a segment identifier (SID) comprises forwarding a data packet through the second interface; and a processor coupled to the first interface and the second interface and configured to:

send the SID to the second PE device;

receive the data packet from the second PE device via the first interface, wherein the data packet comprises a destination address that is the SID; and avoid sending the data packet via the first interface when the second interface is in a faulty state.

18. The first PE device of claim 17, wherein the processor is further configured to store an entry comprising the SID and a second identifier of the second interface, and wherein the entry does not comprise a first identifier of the first interface.

19. The first PE device of claim 17, wherein the processor is further configured to discard the data packet when the second interface is in the faulty state.

20. The first PE device of claim 17, wherein the first PE device is in a Segment Routing over Internet Protocol version 6 (SRv6) Ethernet virtual private network (EVPN).

21. The first PE device of claim 17, wherein the processor is further configured to further send the SID to the second PE device by sending a Border Gateway Protocol (BGP) message comprising an attribute, and wherein the attribute comprises the SID.

22. The first PE device of claim 21, wherein the attribute is a Segment Routing over Internet Protocol version 6 (SRv6) virtual private network (VPN) SID attribute.

23. The first PE device of claim 17, wherein the SID is a Segment Routing over Internet Protocol version 6 (SRv6) SID.

24. A communications system comprising:

a second provider edge (PE) device; and a first PE device comprising a first interface and a second interface and configured to:

connect via the second interface to a customer edge (CE) device that is multi-homed to the first PE device and the second PE device in an all-active mode;

connect to the second PE device via the first interface;

send a segment routing (SID) to the second PE device, wherein an operation associated with the SID comprises forwarding a data packet through the second interface;

receive the data packet from the second PE device and via the first interface, wherein the data packet comprises a destination address that is the SID; and avoid sending the data packet via the first interface when the second interface is in a faulty state, wherein the second PE device is configured to:

receive the SID from the first PE device; and send the data packet to the first PE device via the first interface.

\*    \*    \*    \*    \*